US009235364B2

(12) United States Patent
Park et al.

(10) Patent No.: US 9,235,364 B2
(45) Date of Patent: Jan. 12, 2016

(54) METHOD AND APPARATUS TO PERFORM IMAGE FORMING JOB BY USING NETWORK

(71) Applicant: SAMSUNG Electronics Co., Ltd., Suwon-si, Gyeonggi-do (KR)

(72) Inventors: Hyun-wook Park, Suwon-si (KR); Byeong-tak Jo, Suwon-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days.

(21) Appl. No.: 14/471,125

(22) Filed: Aug. 28, 2014

(65) Prior Publication Data

US 2015/0116746 A1  Apr. 30, 2015

(30) Foreign Application Priority Data

Oct. 31, 2013  (KR) .......................... 10-2013-0131516

(51) Int. Cl.
*G06F 3/12* (2006.01)
*H04N 1/00* (2006.01)

(52) U.S. Cl.
CPC ............ *G06F 3/1263* (2013.01); *G06F 3/1212* (2013.01); *G06F 3/1292* (2013.01); *H04N 1/00103* (2013.01); *H04N 1/00244* (2013.01); *H04N 2201/0094* (2013.01)

(58) Field of Classification Search
USPC ........................................................ 358/1.13
See application file for complete search history.

(56) References Cited

U.S. PATENT DOCUMENTS

| | | | |
|---|---|---|---|
| 8,806,023 B2 * | 8/2014 | Desai ................... | H04W 76/023 709/227 |
| 2004/0174557 A1 * | 9/2004 | Sasama ................. | G06F 3/1263 358/1.15 |
| 2013/0148162 A1 | 6/2013 | Park et al. | |

\* cited by examiner

*Primary Examiner* — Ngon Nguyen
(74) *Attorney, Agent, or Firm* — Staas & Halsey LLP

(57) ABSTRACT

An apparatus and method of forming an image for image-forming data includes connecting the image-forming apparatus to a device by using a wireless communication, receiving image-forming data from the connected device; adjusting a priority order of the image-forming data that is received from the device, according to a type of the device or a mode in which the image-forming apparatus is connected to the device, and based on the adjusted priority of the image-forming data, forming an image for the image-forming data.

20 Claims, 17 Drawing Sheets

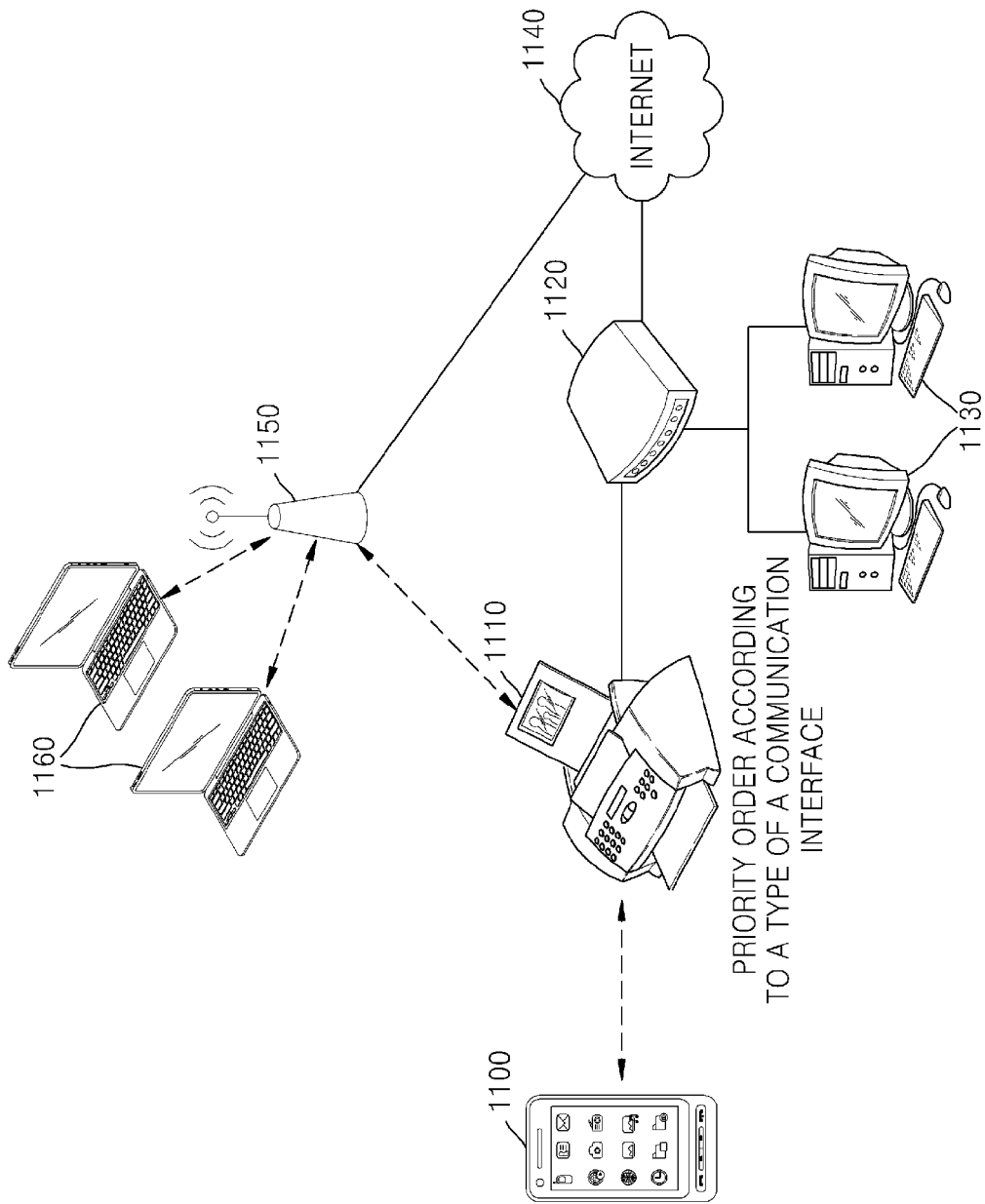

FIG. 11B

Job status

[Active Jobs] [Completed Jobs]

Active Jobs

Active Jobs:0

[Delete]   [Search by Job Name] [🔍▶]

| Jobs Number | Jobs Name | Status | User | Job Type | Interface |
|---|---|---|---|---|---|
| 801 | Print1 | Printing | user1 | Mobile Print | WiFi-Direct |
| 802 | Print2 | Printing | user2 | Host Print | Ethernet |
| 803 | Print3 | Printing | user3 | Host Print | Wi-Fi |

[Close]

FIG. 13B

| Category | ID Value | Sub Category | ID Value |
|---|---|---|---|
| Computer | 1 | PC | 1 |
| | | Server | 2 |
| | | Media Center | 3 |
| | | Ultra-mobile PC | 4 |
| | | Notebook | 5 |
| | | Desktop | 6 |
| | | MID (Mobile Internet Device) | 7 |
| | | Netbook | 8 |
| Input Device | 2 | Keyboard | 1 |
| | | Mouse | 2 |
| | | Joystick | 3 |
| | | Trackball | 4 |
| | | Gaming controller | 5 |
| | | Remote | 6 |
| | | Touchscreen | 7 |
| | | Biometric reader | 8 |
| | | Barcode reader | 9 |
| Printers, Scanners, Faxes and Copies | 3 | Printer or Print Server | 1 |
| | | Scanner | 2 |
| | | Fax | 3 |
| | | Copier | 4 |
| | | All-in-one (Printer, Scanner, Fax, Copier) | 5 |
| Camera | 4 | Digital Still Camera | 1 |
| | | Video Camera | 2 |
| | | Web Camera | 3 |
| | | Security Camera | 4 |
| Storage | 5 | NAS | 1 |
| Network Infrastructure | 6 | AP | 1 |
| | | Router | 2 |
| | | Switch | 3 |
| | | Gateway | 4 |
| | | Bridge | 5 |

DETERMINING A PRIORITY ORDER ACCORDING TO INFORMATION INCLUDED IN IMAGE-FORMING DATA

METHOD AND APPARATUS TO PERFORM IMAGE FORMING JOB BY USING NETWORK

CROSS-REFERENCE TO RELATED APPLICATIONS

This application claims priority under 35 U.S.C. §119 from Korean Patent Application No. 10-2013-0131516, filed on Oct. 31, 2013, in the Korean Intellectual Property Office, the disclosure of which is incorporated herein in its entirety by reference.

BACKGROUND OF THE INVENTION

1. Field of the Invention

The present general inventive concept relates to a method of forming an image by adjusting a priority order of image-forming data and an image-forming apparatus to perform the same.

2. Description of the Related Art

Typically, if several users share and use a printer/multi-functional printer (MFP) via a network, print jobs, transmitted by the several users via the network, may be frequently accumulated in the printer/MFP. A user who wants to print an image by using a mobile device requests a print job near the printer/MFP. However, a print job, transmitted from the mobile device, may be processed only after a print job received from another device is processed. Thus, a user may have to wait for a long period of time until obtaining a printout. Particularly, a user who desires to print an image by using a mobile device usually has a small amount of data to be printed, but the user needs to transmit a print job nearby a printer/MFP and wait until other print jobs are completed, thereby causing inconvenience. Thus, the printer/MFP may need to process a print job transmitted by the mobile device earlier than print jobs transmitted by other devices.

SUMMARY OF THE INVENTION

The present general inventive concept provides a method of forming an image by adjusting a priority order of image-forming data, an image-forming apparatus to perform the same, and a computer-readable medium to contain computer-readable codes as a program to execute the method.

Additional features and utilities of the present general inventive concept will be set forth in part in the description which follows and, in part, will be obvious from the description, or may be learned by practice of the general inventive concept The foregoing and/or other features and utilities of the present general inventive concept may be achieved by providing a method of performing an image-forming job by using a network, which is performed by an image-forming apparatus, the method including connecting the image-forming apparatus to a device by using a wireless communication; receiving image-forming data from the connected device, adjusting a priority order of the image-forming data that is received from the device, according to a type of the device or a mode in which the image-forming apparatus is connected to the device, and based on the adjusted priority of the image-forming data, forming an image for the image-forming data.

The adjusting of the priority order may include, if a type of the device includes a mobile device, adjusting the priority order of the image-forming data that is received from the device to be higher than a priority order of image-forming data that is received from another device.

The image-forming data that is received from the device may include information that represents a type of the device. The method may further include determining a type of the device, based on the information that represents the type of the device, wherein the adjusting of the priority order includes, if the determined type of the device includes a mobile device, adjusting the priority order of the image-forming data that is received from the device to be higher than a priority order of image-forming data that is received from another device.

The method may further include: receiving device identification information, in which a type of the device may be identified, from the device; and determining a type of the device, based on the device identification information, wherein the adjusting of the priority order includes, if the determined type of the device includes a mobile device, adjusting the priority order of the image-forming data that is received from the device to be higher than a priority order of image-forming data that is received from another device.

The method may further include determining a type of the device, according to a mode of emulating the received image-forming data, wherein the adjusting of the priority order includes, if the determined type of the device includes a mobile device, adjusting the priority order of the image-forming data that is received from the device to be higher than a priority order of image-forming data that is received from another device.

The method may further include determining a type of a communication interface that is connected to the device, wherein the adjusting of the priority order includes adjusting the priority order of the image-forming data based on the determined type of the communication interface.

The adjusting of the priority order may include, if the determined type of the communication interface includes a WiFi-Direct interface, adjusting the priority order of the image-forming data that is received from the device to be higher than a priority order of image-forming data that is received from another device.

The method may further include allocating an internet protocol (IP) address to the connected device; and determining whether an IP address, which is included in the image-forming data received from the device, matches the allocated IP address of the device.

The adjusting of the priority order may include, if it is determined that the IP address, which is included in the image-forming data received from the device, matches the allocated IP address of the device, adjusting the priority order of the image-forming data that is received from the device to be higher than a priority order of image-forming data that is received from another device.

The method may further include receiving identification information of the device through near field communication (NFC) tagging with the device; and when connecting the image-forming apparatus to the device, determining whether identification information of the device, which is exchanged with the device, matches the received identification information of the device, wherein the adjusting of the priority order includes, if it is determined that the identification information of the device, which is exchanged with the device, matches the received identification information of the device, adjusting the priority order of the image-forming data that is received from the device to be higher than a priority order of image-forming data that is received from another device.

The method may further include receiving from a user a user input that indicates whether a priority order of the image-forming data is to be adjusted according to a type of the device or a mode in which the image-forming apparatus is connected to the device.

The adjusting of the priority order may include, if receiving from the user the user input that indicates whether a priority order of the image-forming data is to be adjusted according to a type of the device or a mode in which the image-forming apparatus is connected to the device, adjusting the priority order of the image-forming data that is received from the device.

The foregoing and/or other features and utilities of the present general inventive concept may also be achieved by providing an image-forming apparatus including a communication unit to connect the image-forming apparatus to a device by using a wireless communication, wherein the communication unit receives image-forming data from the connected device, The image-forming apparatus further includes an adjustment unit for adjusting a priority order of the image-forming data that is received from the device, according to a type of the device or a mode in which the image-forming apparatus is connected to the device; and an image-forming unit for forming an image for the image-forming data, based on the adjusted priority of the image-forming data.

If a type of the device includes a mobile device, the adjustment unit may adjust a priority order of the image-forming data that is received from the device to be higher than a priority order of image-forming data that is received from another device.

The image-forming data that is received from the device may include information that represents a type of the device. The image-forming apparatus may further include a determination unit for determining a type of the device, based on the information that represents the type of the device, wherein, if the determined type of the device includes a mobile device, the adjustment unit adjusts a priority order of the image-forming data that is received from the device to be higher than a priority order of image-forming data that is received from another device.

The communication unit may receive device identification information, in which a type of the device may be identified, from the device.

The image-forming apparatus further includes a determination unit for determining a type of the device, based on the device identification information, wherein, if the determined type of the device includes a mobile device, the adjustment unit adjusts a priority order of the image-forming data that is received from the device to be higher than a priority order of image-forming data that is received from another device.

The image-forming apparatus further includes a determination unit for determining a type of the device, according to a mode of emulating the received image-forming data, wherein, if the determined type of the device includes a mobile device, the adjustment unit adjusts a priority order of the image-forming data that is received from the device to be higher than a priority order of image-forming data that is received from another device.

The image-forming apparatus further includes a determination unit for determining a type of a communication interface that is connected to the device, wherein the adjustment unit adjusts a priority order of the image-forming data that is received from the device based on the determined type of the communication interface.

The image-forming apparatus further includes an IP address allocation unit for allocating an IP address to the connected device; and a determination unit for determining whether an IP address, which is included in the image-forming data received from the device, matches the allocated IP address of the device, wherein, if it is determined that the IP address, which is included in the image-forming data received from the device, matches the allocated IP address of the device, the adjustment unit adjusts a priority order of the image-forming data that is received from the device to be higher than a priority order of image-forming data that is received from another device.

The communication unit may receive receiving identification information of the device through near field communication (NFC) tagging with the device, and the image-forming apparatus may further include a determination unit for, when connecting the image-forming apparatus to the device, determining whether identification information of the device, which is exchanged with the device, matches the received identification information of the device, wherein, if it is determined that the identification information of the device, which is exchanged with the device, matches the received identification information of the device, the adjustment unit adjusts a priority order of the image-forming data that is received from the device to be higher than a priority order of image-forming data that is received from another device. The image-forming apparatus further includes a user input unit for receiving from a user a user input that indicates whether a priority order of the image-forming data is to be adjusted according to a type of the device or a mode in which the image-forming apparatus is connected to the device, wherein, if receiving from the user input unit the user input that indicates whether a priority order of the image-forming data is to be adjusted according to a type of the device or a mode in which the image-forming apparatus is connected to the device, the adjustment unit adjusts a priority order of the image-forming data that is received from the device.

The foregoing and/or other features and utilities of the present general inventive concept may also be achieved by providing a non-transitory computer-readable storage medium having stored thereon a computer program, which when executed by a computer, may perform the method described above or hereinafter.

The foregoing and/or other features and utilities of the present general inventive concept may also be achieved by providing an image-forming apparatus including an adjustment unit to adjust a priority order of image-forming data received from one or more external devices, according to a characteristic of one of the external devices such that the image-forming data are printed on a print medium according to the adjusted priority order.

The image-forming apparatus may further include a display unit to display a user interface corresponding to the priority order of the image-forming data.

The characteristic of the one external device may be different from the other external devices. The one external device may be one or more external mobile devices.

The characteristic of the one external device may include at least one of a communication with the one external device, a type of the one external device, and a mode corresponding to the image-forming data of the one external device. The one external device may be one or more external mobile devices.

BRIEF DESCRIPTION OF THE DRAWINGS

These and/or other features and utilities of the present general inventive concept will become apparent and more readily appreciated from the following description of the embodiments, taken in conjunction with the accompanying drawings of which:

FIGS. 11A and 11B are diagrams illustrating an image forming system to form an image by adjusting a priority order of image-forming data, received from a mobile device, according to a type of a communication interface, according to an embodiment of the present general inventive concept;

FIGS. 13A and 13B are diagrams illustrating an image forming system to form an image by adjusting a priority order of image-forming data, received from a mobile device, based on device identification information, according to an embodiment of the present general inventive concept;

DETAILED DESCRIPTION OF THE PREFERRED EMBODIMENTS

Figure 1:
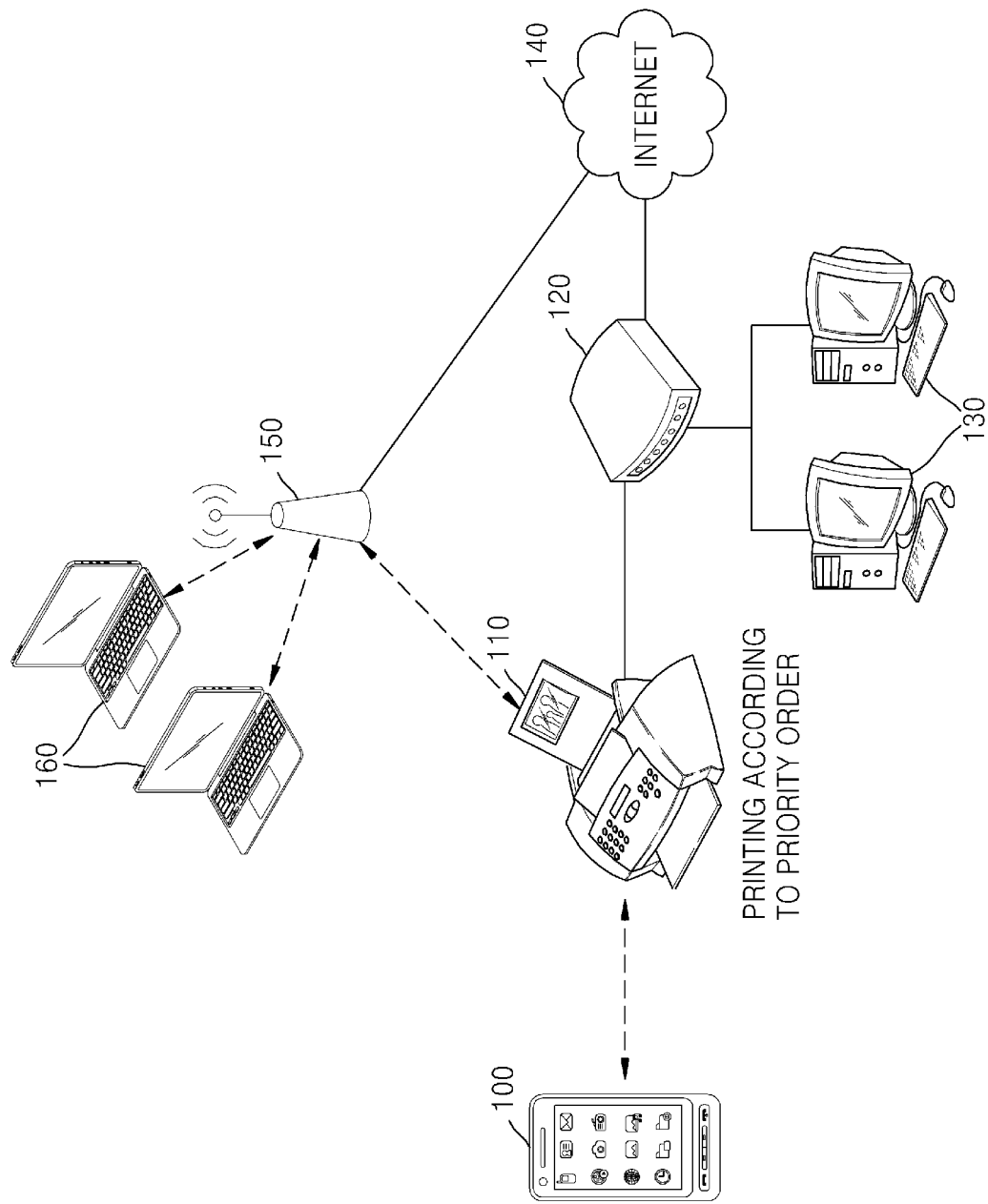
FIG. 1 is a diagram illustrating an image forming system in which various devices share an image-forming apparatus according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Hereinafter, an image forming system according to an embodiment of the present general inventive concept will be described in detail with reference to the attached drawings. In the following description, the image forming system may include well-known functions or constructions, and thus detailed descriptions thereof are not described hereinafter.

FIG. 1 is a diagram illustrating an image forming system in which various devices share an image-forming apparatus according to an embodiment of the present general inventive concept.

Referring to FIG. 1, several users may share and use a printer/ multifunctional printer (MFP) 110 via a network in an environment of the image forming system to print data on a print medium using a printing unit (not illustrated).

A user may use a mobile device 100 to be connected to the printer/MFP via a WiFi-Direct connection. Additionally, the printer/MFP 110 is wired-connected to a router 120, and the router 120 is wired-connected to a personal computer (PC) 130. Accordingly, a user who uses the PC 130 may connect the PC 130 to the printer/MFP 110 via the router 120. It is possible that the mobile device 100 may be connected to at least one of the printer/MFP 110, the router 120, and an access point (AP) to control the devices in the image forming system and to be connected to the Internet 140.

A notebook computer 160 is connected to the access point (AP) 150 via a wireless network such as wireless fidelity (Wi-Fi), and the AP 150 is connected to the printer/MFP 110 via a wireless network or a wired network. Accordingly, a user of the notebook computer 160 may use the printer/MFP 110 via the AP 150 by using the notebook computer 160. Accordingly, in the current embodiment, several users share and use the printer/MFP 110 by using the mobile device 100, the PC 130, or the notebook computer 160.

However, when several users use the printer/MFP 110, several requests for printing may be transmitted to the printer/MFP 110 at the same time from the several users using the several devices illustrated in FIG. 1. The term of "at the same time" may be referred to as a period of time in which several requests are sent to the printer/MFP 110 and any one of the requests are not completed. The term of "at the same time" may be referred to as a time when one or more requests are accumulated and included in a state being ready to form an image until a previously received request for an image forming (printing) process is processed or completed. If the several requests for printing are transmitted to the printer/MFP 110, the printer/MFP 110 may not immediately process all the requests. Accordingly, requests for printing, which have not been processed, may be accumulated in the printer/MFP 110. Even if requests for printing are accumulated in the printer/MFP 110, a user of the PC 130 or the notebook computer 160 may wait for printing while doing the user's own work, and thus it may cause inconvenience. However, in order to use the printer/MFP 110, a user of the mobile device 100 needs to carry the mobile device 100 and approach the printer/MFP 110 so that the mobile device 100 can be connected to the printer/MFP 110. Thus, the user of the mobile device 100 waits near the printer/MFP 110 until the user obtains a printout. However, if the printer/MFP 110 has previously or simultaneously received a request for printing from another device such as the PC 130 or the notebook computer 160, the user of the mobile device 100 may have to wait until printing according to the request for printing from another device is finished.

However, according to an embodiment of the present general inventive concept, if a user of the printer/MFP 110 requests the printer/MFP 110 for printing by using the mobile device 110, the mobile device 100 adjusts a priority order of a print job, according to a request for printing from the user, such that the priority order of the print job from the mobile device can be higher than other print jobs. That is, the print job of the mobile device can be printed before the other print job of other devices is preformed. When a print job requested by the other PC 130 or the notebook computer 160 is received earlier than a print job requested by the mobile device 100, the printer/MFP 110 performs the print job requested by the mobile device 100 according to a priority order of the adjusted print job. Thus, the user of the mobile device 100 may obtain a desired printout, without having to wait for a long period of time until printing performed according to the request for printing from another device is finished.

When more than two mobile devices are connected to the printer/MFP 110, requests from the two mobile devices can be randomly processed and can have a higher priority than devices other than the mobile devices. It is possible that one of the more than two mobile devices may have a higher priority than the other one of the mobile devices. It is also possible that one of the mobile devices may have a higher priority than other devices and the other mobile device may not have a higher priority than other devices. The priorities between the mobile devices can be set up in the printer/MFP 110. The priority settings can be done through a user interface displayed on a display unit of the printer/MFP 110 and a user input or selection to assign a higher priority to at least one of the mobile devices. The user interface may include one or more mobile devices and provide the user to select at least one of the mobile devices of the user interface. The printer/MFP 110 may set a highest priority to the selected one of the mobile device among devices connectable to the printer/MFP 110. It is possible that the printer/MFP 110 may recognize a first mobile device connected thereto at a first time, for example, before other mobile device is connected as a mobile device having a highest priority. It is also possible that when the mobile device is connected to the printer/MFP 110, the printer/MFP 110 generates a user interface to be displayed on a display unit so that a user can select the mobile device through the displayed user interface as a mobile device with a highest priority. When the requests include a request from the mobile device, the printer/MFP 110 may automatically rearrange a printing order such that the printing request of the highest priority can be performed than other printing request of lower priorities. It is possible that the printer/MFP 110 can display the original printing order and/or the rearranged (adjusted) printing order.

Figure 2:
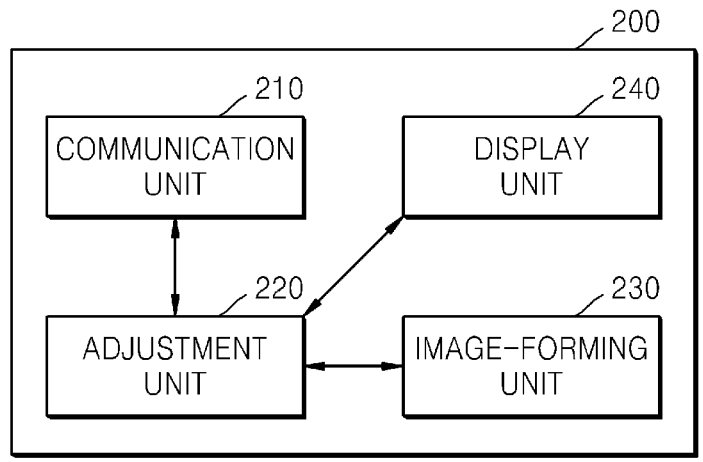
FIG. 2 is a diagram illustrating the image-forming apparatus of FIG. 1 according to an embodiment of the present general inventive concept.

FIG. 2 is a diagram illustrating an image-forming apparatus 200 usable in an image forming system according to an embodiment of the present general inventive concept. The image-forming apparatus 200 may be similar to or the same as the printer/MFP 110 of the image forming system of FIG. 1.

Referring to FIG. 2, the image-forming apparatus 200 includes a communication unit 210, an adjustment unit 220, and an image forming unit 230. The image-forming apparatus 200 may further include a display unit 240 as an output device to display an image according to a control signal of the adjustment unit 220 or an output/input device to display an image and to receive a user input to control the adjustment unit 220 and other units of the image-forming apparatus 200.

The communication unit 210 is connected to a device by using a wireless communication mode. The communication unit 210 may be connected to a device by using a wireless communication standard such as Wi-Fi Direct, Bluetooth, or Wi-Fi. Alternately, the communication unit 210 may be connected to a device by using a wired communication.

Additionally, the communication unit 210 receives device identification information, in which a type of a device may be identified, from the device. The device identification information may be information that represents a type of a device. For example, the device identification information of a mobile device may include information that represents a mobile device, and the device identification information of a PC may include information that represents a PC.

The communication unit 210 may receive image-forming data from a device. The image-forming data may include information to represent a type of the device.

Additionally, when a user performs near field communication (NFC) tagging by using a device, the communication unit 210 may receive identification information of the device, and the image-forming apparatus 200 may store the identification information of the device. Additionally, the communication unit 210 may receive device identification information, which is exchanged with the device when the image-forming apparatus 200 is connected to the device. Here, the device may include a tag including information and the communication unit 210 may include a tag reader to read or receive the information from the tag of the device. The communication unit 210 is connected to the device via Wi-Fi Direct.

The adjustment unit 220 may be a micro processor or a controller to control functions of the image-forming apparatus 200. The adjustment unit 220 may adjust a priority order of image-forming data that is received from the device. If a type of the device is a mobile device, the adjustment unit 220 may adjust a priority order of image-forming data that is received from the mobile device to be higher than a priority order of image-forming data that is received from another device. Accordingly, even when image-forming data that is received from the mobile device is received later than image-forming data that is received from another device, an image for the image-forming data that is received from the mobile device with the priority may be formed.

A determination unit (not illustrated) determines a type of a communication interface that is connected to a device. The adjustment unit 220 may adjust a priority order of image-forming data received from a mobile device, based on the type of the interface that is determined by the determination unit (not illustrated).

In detail, if a communication interface that is determined by the determination unit (not illustrated) is a WiFi-Direct interface, the adjustment unit 220 may adjust a priority order of image-forming data that is received from a mobile device to be higher than a priority order of image-forming data that is received from another device. For example, a mode of communicating between the image-forming apparatus and the mobile device may be a communication mode or method, for example, a WiFi-Direct mode, and image-forming data may be received from the mobile device via a WiFi-Direct communication interface. The determination unit (not illustrated) may determine whether a communication interface that is connected to the mobile device is the WiFi-Direct communication interface, based on the receiving of the image-forming data from the mobile device via the WiFi-Direct communication interface. The adjustment unit 220 may adjust a priority order of the image-forming data that is received from the mobile device to be higher than a priority order of image-forming data that is received from another device.

After the mobile device is connected to the image-forming apparatus 200, the communication unit 210 may include an internet protocol (IP) address allocation unit (not illustrated) to allocate an IP address to the mobile device. In a WiFi-Direct environment, the image-forming apparatus 200 may become a group owner (GO) and perform an operation that is similar to an AP in the WiFi environment. Accordingly, the image-forming apparatus 200 allocates an IP address to clients by driving a dynamic host configuration protocol (DHCP) server. A class C may be used as an IP address class that is allocated to the mobile device by the IP address allocation unit (not illustrated). Since the IP address allocation unit directly allocates an IP address to the connected mobile device, the image-forming apparatus 200 recognizes an IP address of devices that are connected to the image-forming apparatus 200 via a WiFi-Direct connection.

The determination unit determines whether an IP address that is included in image-forming data received from a device matches an IP address that is allocated to the device by the IP address allocation unit. Accordingly, if it is determined that the IP address that is included in the image-forming data matches the IP address that is allocated to the device, the adjustment unit 220 adjusts a priority order of the image-forming data that is received from the corresponding device to be higher than a priority order of the image-forming data that is received from another device. Thus, an image for the image-forming data that is received from the corresponding device may be formed earlier than an image for the image-forming data that is received from the other device and is in a standby mode. In other words, when the communication unit 210 receives the image-forming data, the communication unit 210 checks an IP address of a source, which has transmitted the image-forming data, from the image-forming data. Then, if the IP address of the image-forming data is in a range of the IP address allocated to the device, a priority order of the image-forming data is adjusted so that an image for the image-forming data may be formed earlier than an image of the other image-forming data.

The communication unit 210 may receive device identification information, in which a type of a device may be identified, from the device. The determination unit may determine a type of the device, based on the device identification information that is received from the device. If the determined device type is a mobile device, the adjustment unit 220 may adjust a priority order of image-forming data that is received from the device to be higher than a priority order of image-forming data that is received from another device. For example, the communication unit 210 may receive device identification information, which represents that a device is a mobile device, from the mobile device. The determination may determine that a type of the device is a mobile device, based on information that the device is a mobile device. If the determined type of the device is a mobile device, the adjustment unit 220 may adjust an order so that an image of the image-forming data, received from the corresponding device, may be formed earlier than an image of the image-forming data received from another device.

The communication unit 210 may receive the device identification information through NFC tagging. In this case, an NFC mode provided by the communication unit 210 is an NFC peer-to-peer (P2P) communication mode. The device may read or receive information, such as connection information, from the image-forming apparatus 200, and may transmit information to the image-forming apparatus 200 according to an NFC handover protocol. In this case, if the NFC tagging is performed with the image-forming apparatus 200 by using the device, the image-forming apparatus 200 receives identification information such as a media access control (MAC) address from the device, and stores the identification information. Then, the device handovers a connection thereof to a WiFi-Direct connection and attempts to be connected via the WiFi-Direct connection.

Then, the device transmits image-forming data to the communication unit 210. The communication unit 210 receives the image-forming data from the device, and obtains identification information from the image-forming data. Then, the determination unit (not illustrated) determines whether the obtained identification information of the device matches stored device identification information. If it is determined that the obtained identification information of the device matches the stored device identification information, the determination unit determines that the device is a device that is connected through NFC tagging. Thus, the adjustment unit 220 adjusts a priority order of the image-forming data of the device to be higher than the other image-forming data, so that an image for the image-forming data of the device may be formed earlier than an image of the other image-forming data which is in a standby state. However, the present general inventive concept is not limited thereto. It is possible that the image-forming apparatus 200 may receive identification information of a device through NFC tagging.

When being connected to the device, the image-forming apparatus 200 compares identification information that is previously exchanged with the device to the received identification information, and determines if the identification information that is previously exchanged with the device matches the received identification information. If it is determined that the identification information that is previously exchanged with the device matches the received identification information, the image-forming apparatus 200 identifies or recognizes the identification information from the received image-forming data that is received from the device. Then, if the identified identification information corresponds to the matched identification information, the image-forming apparatus 200 determines that the device is a device that is connected to the image-forming apparatus 200 through NFC tagging. Thus, the image-forming apparatus 200 may adjust a priority order of the image-forming data of the corresponding device to be higher than the other image-forming data that is in a standby state, so that the image-forming data of the corresponding device may be image-formed earlier than the other image-forming data.

The image-forming data, received from the device, may include information that represents a type of a device. The determination unit (not illustrated) may determine a type of the device, based on the information corresponding to the type of the device. If the type of the device, determined by the determination unit (not illustrated), is a mobile device, the adjustment unit 220 may adjust a priority order of the image-forming data that is received from the device to be higher than a priority order of the image-forming data that is received from another device.

The determination unit (not illustrated) may determine a mode of emulating image-forming data that is received from the communication unit 210. The image-forming data may become different data (or format) according to an emulation mode, and the determination unit (not illustrated) may determine an emulation mode by recognizing a portion of the image-forming data, which has become the different data (or format) according to the emulation mode. For example, in a case of image-forming data generated by a mobile device, an emulation mode, such as personal wireless gateway (PWG), may be used. In a case of image-forming data generated by a general PC, an emulation mode, such as printer command language 6 (PCL6), may be used. A mobile device may use a different emulation mode from other devices. Thus, by determining an emulation mode, the determination unit (not illustrated) may recognize that the image-forming data is generated from a mobile device. Accordingly, the determination unit (not illustrated) may determine a type of a device according to an emulation mode. If the type of the device, determined by the determination unit (not illustrated), is a mobile device, the adjustment unit 220 may adjust a priority order of the image-forming data that is received from the mobile device to be higher than a priority order of the image-forming data that is received from another device.

The image-forming apparatus 200 may further include a user input reception unit (not illustrated) to receive from a user a user input that indicates whether a priority order of image-forming data of a device is to be adjusted according to a type of the device or a mode by which the image-forming apparatus 200 is connected to the device. If the user input, which is received from the user input reception unit (not illustrated), indicates that a priority order of the image-forming data that is received from the device is to be adjusted according to a type of the device or a mode by which the image-forming apparatus 200 is connected to the device, the adjustment unit may adjust a priority order of the image-forming data that is received from the device. It is possible that the user input reception unit may be included in the display unit 240.

According to the present embodiment, a method of form an image from image-forming data based on a priority order of the image-forming data may be performed in the image-forming apparatus of FIG. 2, for example. Accordingly, a method of forming an image from image-forming data based on a priority order of the image-forming data is illustrated in FIGS. 3 through 10, a description that was provided with regard to FIG. 2 will not be provided here again. Hereinafter, a method of forming an image from image-forming data based on a priority order of the image-forming data is described with reference to the image-forming apparatus 200 of FIG. 2.

Figure 3:
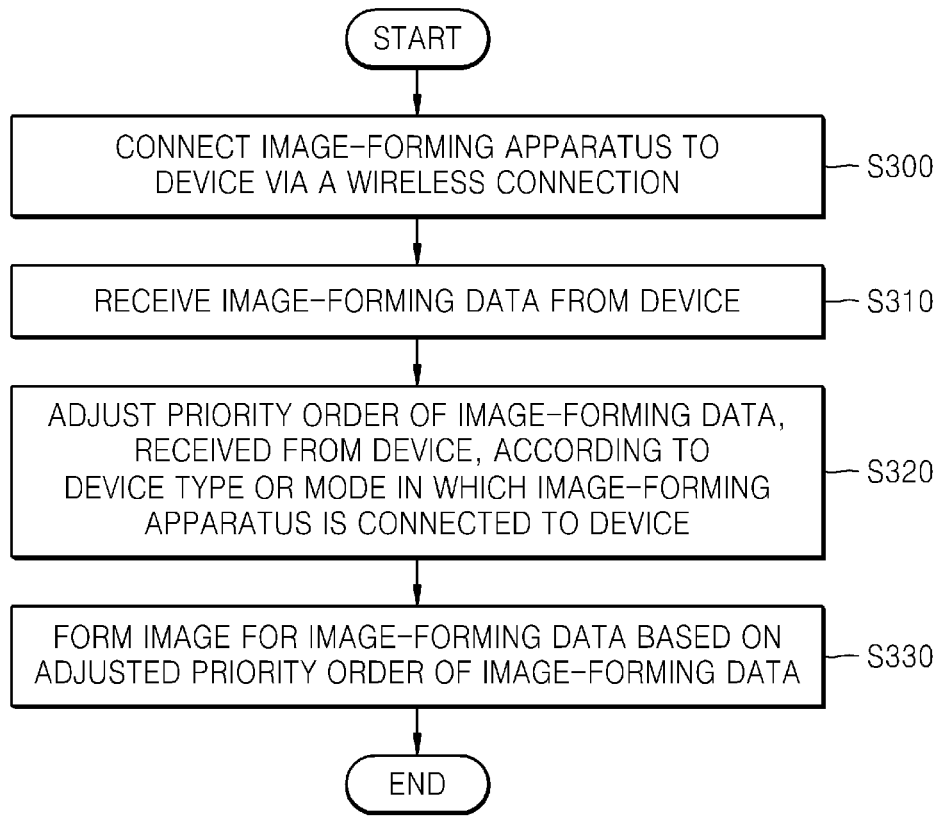
FIG. 3 is a flowchart illustrating an image-forming method according to an embodiment of the present general inventive concept.

FIG. 3 is a flowchart illustrating an image-forming method according to an embodiment of the present general inventive concept.

In operation S300, the image-forming apparatus 200 is connected to a device by using a wired or wireless communication mode.

In operation S310, the image-forming apparatus 200 receives image-forming data from the connected device.

In operation S320, the image-forming apparatus 200 adjusts a priority order of the image-forming data, which is received from the device, according to a type of the device or a mode by which the device is connected to the image-forming apparatus 200.

In operation S330, the image-forming apparatus 200 forms an image for the image-forming data, based on the adjusted priority order of the image-forming data.

Figure 4:
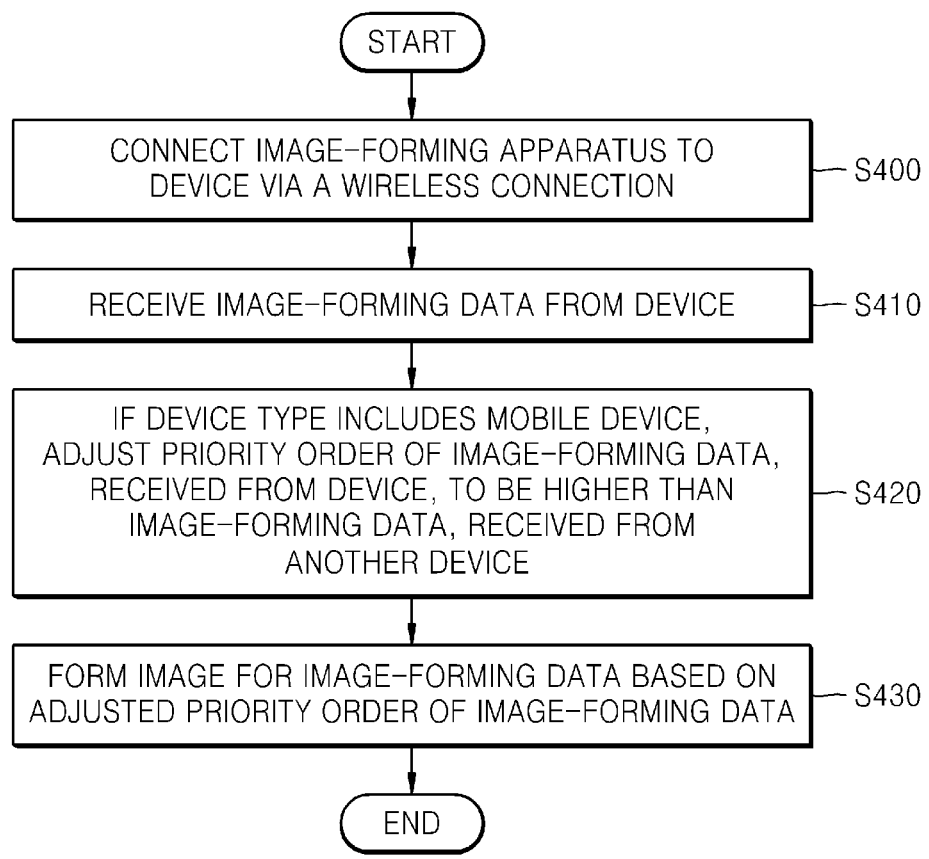
FIG. 4 is a flowchart illustrating an image-forming method according to an embodiment of the present general inventive concept.

FIG. 4 is a flowchart illustrating an image-forming method according to an embodiment of the present general inventive concept.

Operations S400, S410, and S430 of FIG. 4 may correspond to operations S300, S310, and S330 of FIG. 3, respectively. Thus, for the sake of brevity, a detailed description thereof will not be provided here again.

In operation S420, if a type of a device includes a mobile device, the image-forming apparatus 200 adjusts a priority order of image-forming data, received from the device, to be higher than image-forming data that is received from another device. If a type of a device is not a designated device, for example, a mobile device, the image-forming apparatus 200 may not adjust a priority order of the image-forming data.

Figure 5:
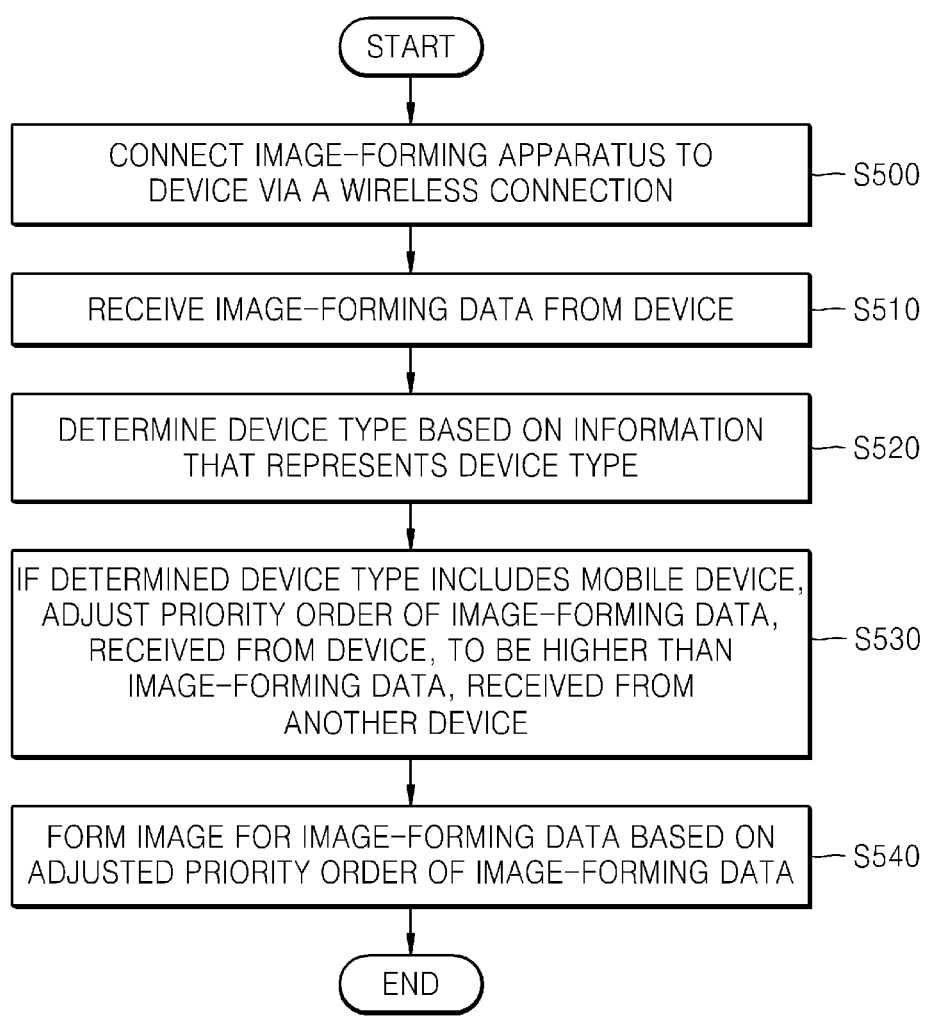
FIG. 5 is a flowchart illustrating an image-forming method according to an embodiment of the present general inventive concept.

FIG. 5 is a flowchart illustrating an image-forming method according to an embodiment of the present general inventive concept.

Operations S500, S510, and S540 of FIG. 5 may correspond to operations S300, S310, and S330 of FIG. 3, respectively. Thus, for the sake of brevity, a detailed description thereof will not be provided here again.

In operation S520, the image-forming apparatus 200 determines a type of a device, based on information that represents the type of the device, included in image-forming data that has been received from the device in operation S510.

In operation S530, if a determined type of the device is a mobile device, the image-forming apparatus 200 may adjust a priority order of the image-forming data that is received from the device to be higher than a priority order of image-forming data that is received from another device.

Figure 6:
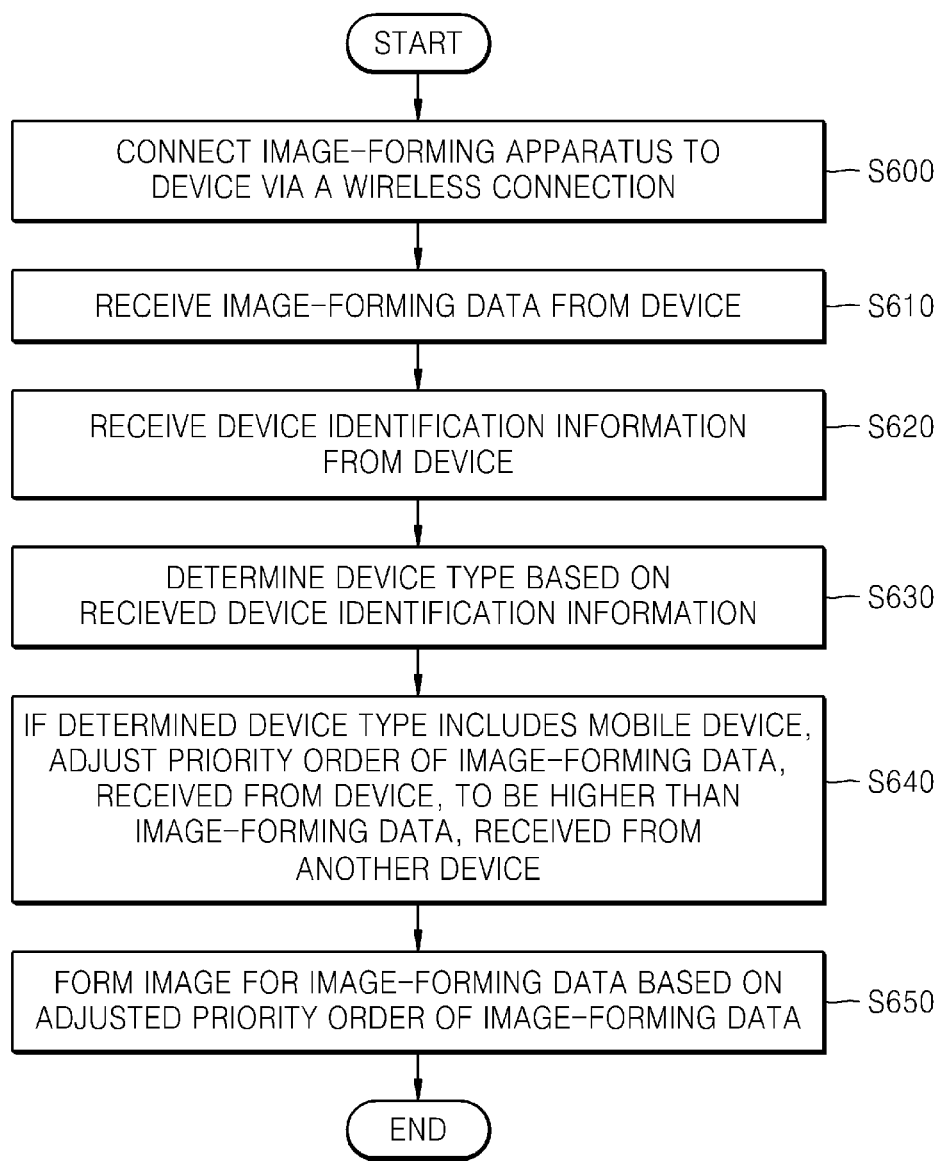
FIG. 6 is a flowchart illustrating an image-forming method according to an embodiment of the present general inventive concept.

FIG. 6 is a flowchart illustrating an image-forming method according to an embodiment of the present general inventive concept.

Operations S600, S610, and S650 of FIG. 6 may correspond to operations S300, S310, and S330 of FIG. 3, respectively. Thus, for the sake of brevity, a detailed description thereof will not be provided here again. In operation S620, the image-forming apparatus 200 may receive device identification information, in which a type of a device may be identified, from the device.

In operation S630, the image-forming apparatus 200 determines the type of the device, based on the device identification information that is received from the device.

In operation S640, if the determined type of the device includes a mobile device, the image-forming apparatus 200 adjusts a priority order of the image-forming data that is received from the device to be higher than a priority order of image-forming data that is received from another device.

Figure 7:
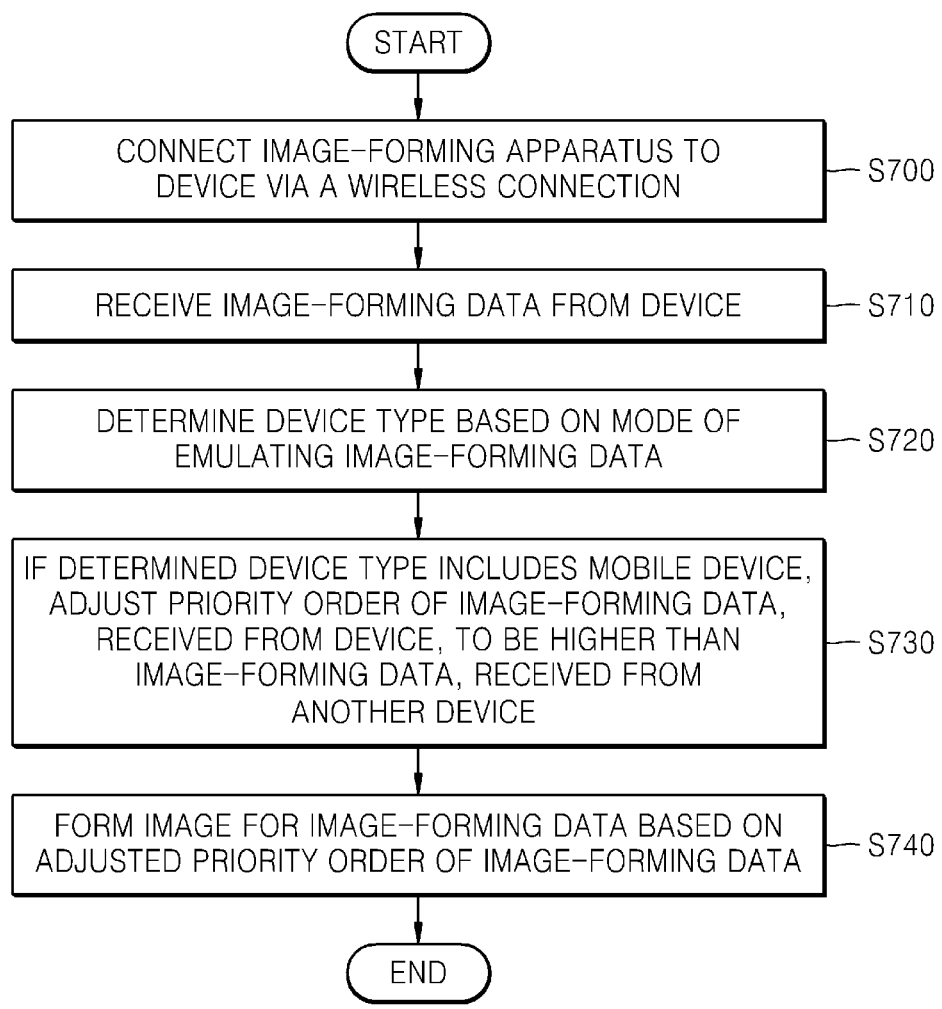
FIG. 7 is a flowchart illustrating an image-forming method according to an embodiment of the present general inventive concept.

FIG. 7 is a flowchart illustrating an image-forming method according to an embodiment of the present general inventive concept.

Operations S700, S710, and S740 of FIG. 7 may correspond to operations S300, S310, and S330 of FIG. 3, respectively. Thus, for the sake of brevity, a detailed description thereof will not be provided here again.

In operation S720, the image-forming apparatus 200 determines a type of a device, based on a mode of emulating the image-forming data that was received from the device in operation S710.

In operation S730, if the determined type of the device is a mobile device, the image-forming apparatus 200 adjusts a priority order of image-forming data that is received from the device to be higher than a priority order of image-forming data that is received from another device.

Figure 8:
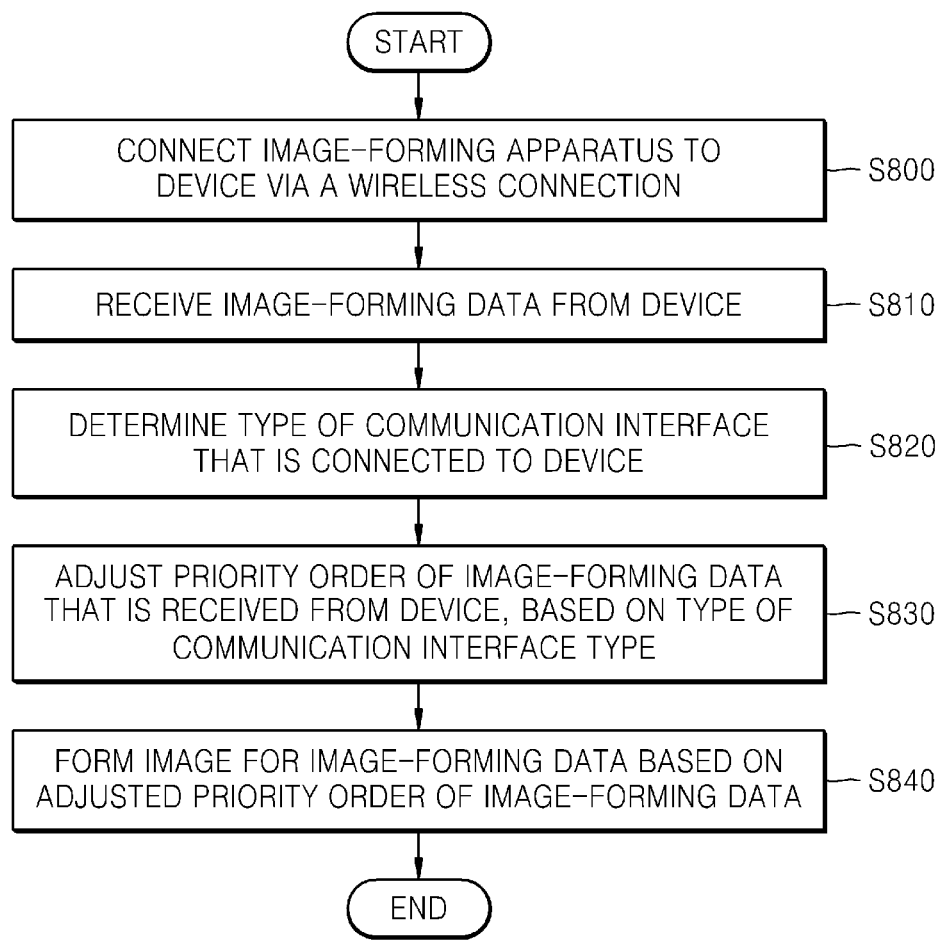
FIG. 8 is a flowchart illustrating an image-forming method according to an embodiment of the present general inventive concept.

FIG. 8 is a flowchart illustrating an image-forming method according to an embodiment of the present general inventive concept.

Operations S800, S810, and S840 of FIG. 8 may correspond to operations S300, S310, and S330 of FIG. 3, respectively. Thus, for the sake of brevity, a detailed description thereof will not be provided here again.

In operation S820, the image-forming apparatus 200 determines a type of a communication interface that is connected to a device.

In operation S830, the image-forming apparatus 200 adjusts a priority order of image-forming data that is received from a device, based on the type of the communication interface.

Figure 9:
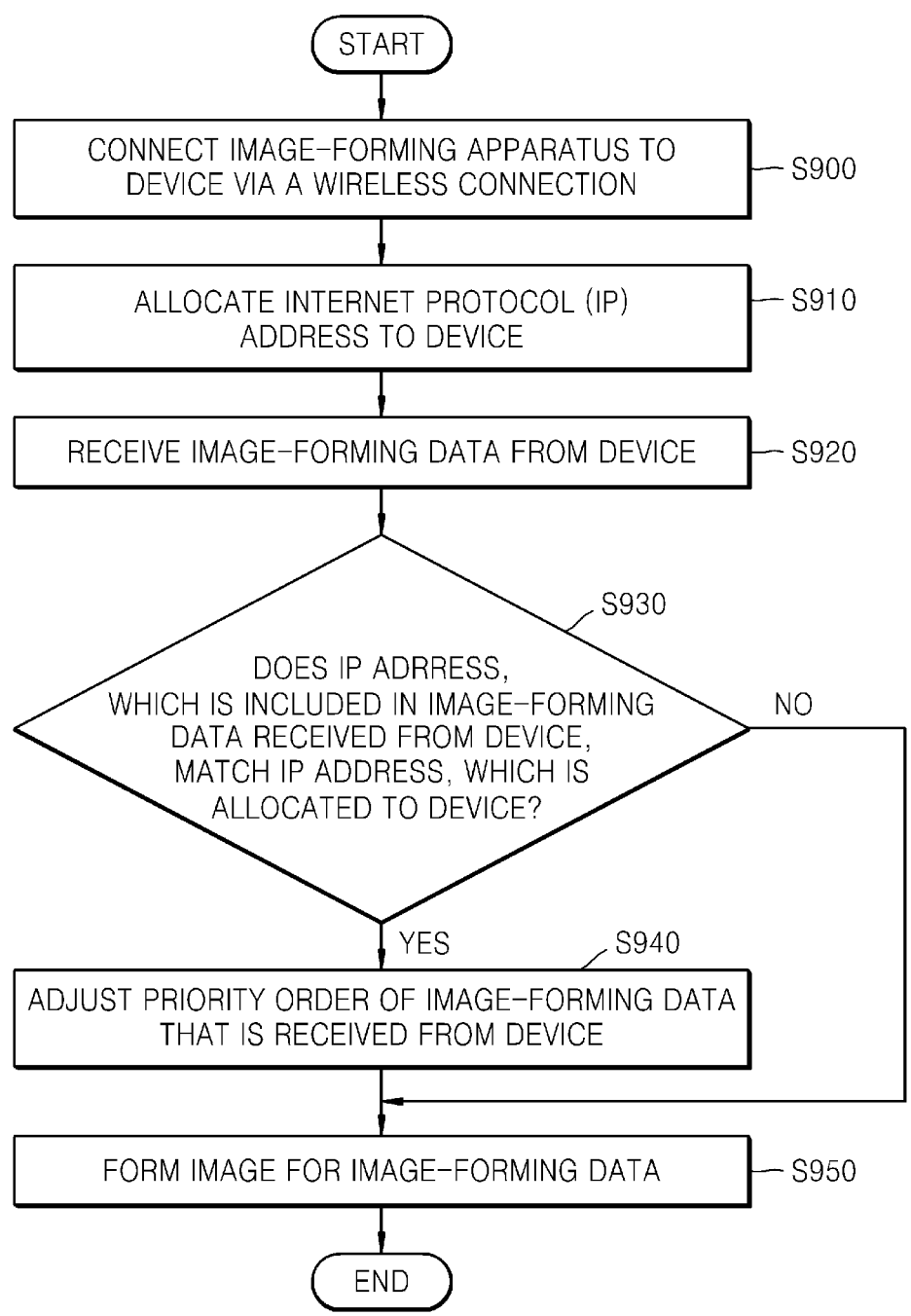
FIG. 9 is a flowchart illustrating an image-forming method according to an embodiment of the present general inventive concept.

FIG. 9 is a flowchart illustrating an image-forming method according to an embodiment of the present general inventive concept.

Operations S900 and S920 of FIG. 9 may correspond to operations S300 and S310 of FIG. 3, respectively. Thus, for the sake of brevity, a detailed description thereof will not be provided here again.

In operation S910, the image-forming apparatus 200 allocates an IP address to a device. The image-forming apparatus 200 may be connected to a device by using a WiFi-Direct mode. The image-forming apparatus 200 may operate as a GO, and thus run a DHCP server to allocate the IP address to the mobile device.

In operation S930, the image-forming apparatus 200 determines whether an IP address, which is included in image-forming data received from the device, matches the IP address that is allocated to the device.

In operation S940, if it is determined that the IP address, which is included in image-forming data received from the device, matches the IP address that is allocated to the device, the image-forming apparatus 200 adjusts a priority order of image-forming data that is received from the device to be higher than a priority order of image-forming data that is received from another device.

In operation S950, the image-forming apparatus 200 forms an image for the image-forming data, based on the priority order of the image-forming data that was adjusted in operation S940. If it is determined that the IP address, which is included in the image-forming data received from the device, matches the IP address that is allocated to the device, a printing job corresponding to the image-forming data received from the device through the IP address may have a top priority whenever the image-forming data is transmitted to the image-forming apparatus 200 using the IP address. That is, the image-forming apparatus 200 forms an image for the image-forming data in an order in which the image-forming data is received from the device through the IP address or whenever the image-forming data is received from the device through the IP address without placing the image-forming data in a conventional printing order.

Figure 10:
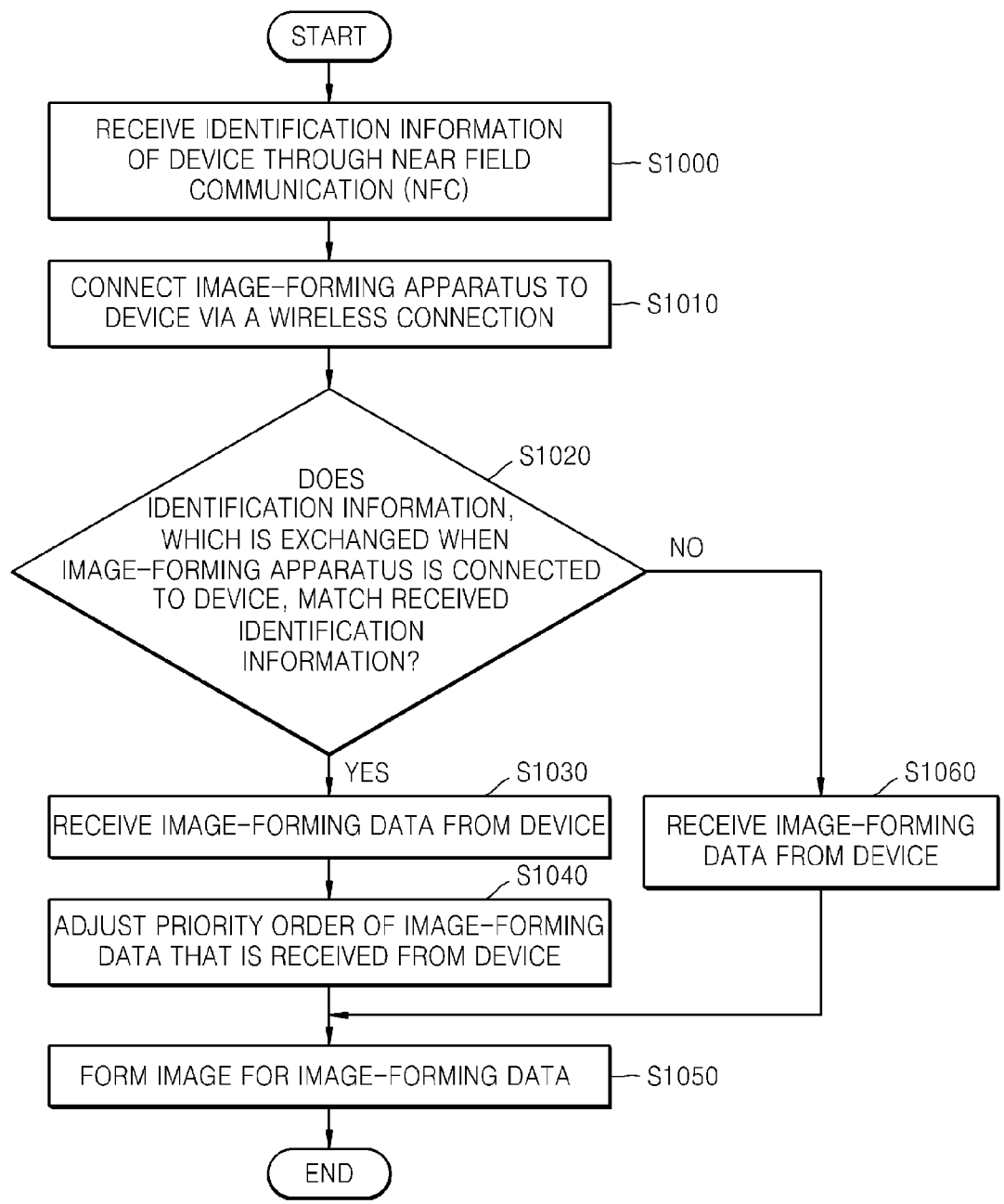
FIG. 10 is a flowchart illustrating an image-forming method according to an embodiment of the present general inventive concept.

FIG. 10 is a flowchart illustrating an image-forming method according to an embodiment of the present general inventive concept.

Operations S1010 and S1050 of FIG. 10 may correspond to operations S300 and S330 of FIG. 3, respectively. Thus, for the sake of brevity, a detailed description thereof will not be provided here again.

In operation S1000, the image-forming apparatus 200 receives identification information of a device through NFC tagging with the device.

In operation S1020, the image-forming apparatus 200 determines whether identification information of the device, which is previously exchanged when the image-forming apparatus 200 is connected to the device, matches the received identification information.

In operation S1030, if the identification information of the device, which is previously exchanged when the image-forming apparatus 200 is connected to the device, matches the received identification information, the image-forming apparatus 200 receives image-forming data of the device.

In operation S1040, the image-forming apparatus 200 adjusts a priority order of the image-forming data that is received from the device.

In operation S1060, if it is determined that the identification information of the device, which is previously exchanged when the image-forming apparatus 200 is connected to the device, does not match the received identification information, the image-forming apparatus 200 receives image-forming data of the device and then forms an image for the received image-forming data without adjusting and/or considering a priority thereof.

The image-forming apparatus 200 adjusts a priority order of the image-forming data that was received from the device in operation S1040, and forms an image for the image-forming data according to the adjusted priority order of the image-forming data in operation S1050. The image-forming apparatus 200 may form an image for the image-forming data that was received from the device in operation 1060, in an order in which the image-forming data is received.

FIGS. 11A and 11B are diagrams illustrating an image forming system to form an image by adjusting a priority order of image forming data, received from a mobile device, according to a type of a communication interface, according to an embodiment of the present general inventive concept.

Referring to FIG. 11A, an image-forming apparatus 1110 is connected to a mobile device 1110, a PC 1130, and a notebook computer 1160. The mobile device 1100 is connected to the image-forming apparatus 1110 by using a mode, for example, a WiFi-Direct connection mode. The PC 1130 is connected to the image-forming apparatus 1110 via a router 1120 by using an Ethernet connection mode, for example. The notebook 1160 is connected to the image-forming apparatus 1110 via an AP 1150 by using a WiFi connection mode, for example. Since data received from each device by the image-forming apparatus 1110 employs a different communication mode from each other, the data may be received via a different communication interface from each other. Accordingly, based on a communication interface via which image-forming data is received, the image-forming apparatus 1110 may determine a device, from which the image-forming data is received. The image-forming apparatus 1110 may determine that the image-forming data, received from the mobile device 1100, is received via a WiFi-Direct communication interface, and thus, adjust a priority order of the image-forming data so that the image-forming data, received from the mobile device 1100, is printed earlier than image-forming data received from another device. The image-forming apparatus 1110 performs printing according to the adjusted priority order of the image-forming data, and thus, a user of the mobile device 1100 may not have to wait for a long period of time until obtaining a printout.

FIG. 11B illustrates a user interface (UI) of an image-forming apparatus, which indicates print jobs, which are printed or wait in a standby mode to be printed, which is accumulated in the image-forming apparatus. The UI may be displayed in a display unit of the image-forming apparatus. It is possible that the image-forming apparatus and a device may communicate with each other to display the UI on a screen of the device. The user interface may transmit a user input to the image-forming apparatus such that a priority of the image-forming data can be adjusted or a printing order of the image-forming data is rearranged according to the priority.

The UI of the image-forming apparatus displays information about a print job such as a job number, a job name, a status, a user, a job type, and an interface. The UI shows that a communication interface through which a print job having a job name of Print 1 is a WiFI-Direct communication interface. Referring back to FIG. 11A, the image-forming apparatus 1110 may determine a communication interface through which image-forming data is received and display the communication interface. Accordingly, if it is determined that a print job whose name is Print 1 is received via WiFi-Direct, then, even if the print job having a name of Print 1 is received later than another print job, the image-forming apparatus may adjust a priority order of print jobs so that printing may be performed first with regard to the print job having the name of Print 1.

Figure 12:
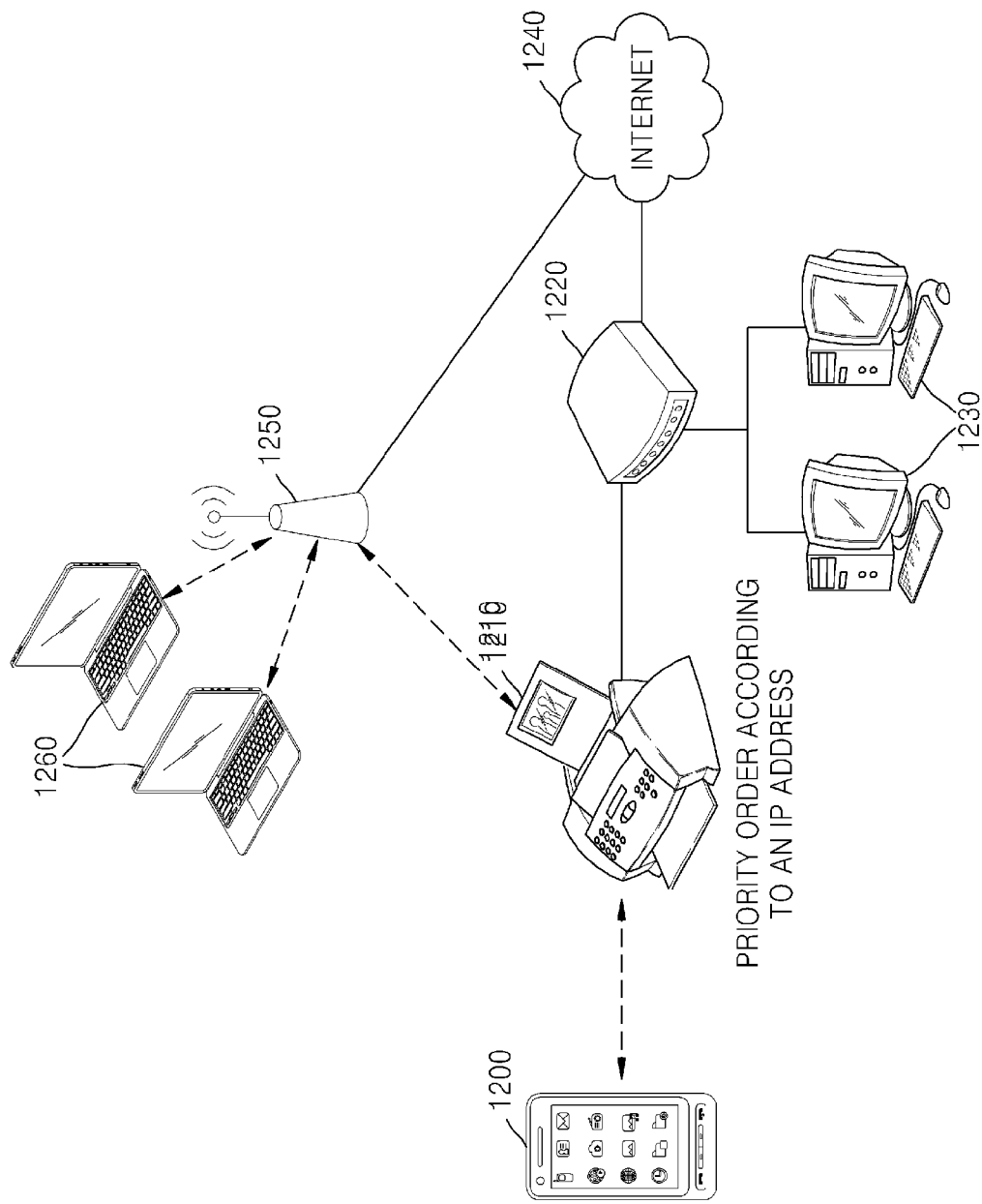
FIG. 12 is a diagram illustrating an image forming system to form an image by adjusting a priority order of image-forming data that is received from a mobile device, with regard to an internet protocol (IP) address that is allocated by an image-forming apparatus, according to an embodiment of the present general inventive concept.

FIG. 12 is a diagram illustrating an image forming system to form an image by adjusting a priority order of image-forming data that is received from a mobile device 1200, with regard to an internet protocol (IP) address that is allocated by an image-forming apparatus 1210, according to another embodiment of the present invention.

Generally, a router 1220 or an AP 1250 allocates an IP address to a PC 1230 or a notebook computer 1260, by driving a DHCP server. In the present embodiment, the mobile device 1200 is connected to the image-forming apparatus 1210 via a WiFi-Direct connection, and the image-forming apparatus 1210 operates as an autonomous GO as a default operation mode. Accordingly, the image-forming apparatus 1210 always operates as a GO, and drives a DHCP server to allocate an IP address to a device that is connected to the image-forming apparatus 1210 via a WiFi-Direct connection. The image-forming apparatus 1210 may store an allocate IP address in the form of a table. The image-forming apparatus 1210 extracts a source IP address from image-forming data that is being received. Then, if the source IP address matches an allocated IP address that is stored in the table, the image-forming apparatus 1210 may determine that the received image forming data is image-forming data received from a device to which an IP address is allocated. Alternately, if a range of an IP address that may be allocated by driving a DHCP server is determined and image-forming data is received from the determined IP address, it may be determined that the image-forming data is received from a device to which the image-forming apparatus 1210 allocated the IP address. The image-forming apparatus 1210 adjusts a priority order of image forming data, received from the mobile device 1200 to which the IP address is allocated, to be higher than a priority order of image forming data received from the PC 1230 or the notebook computer 1260. Thus, image forming data received from the mobile device 1200 may be printed earlier than the image forming data received from the PC 1230 or the notebook computer 1260. Accordingly, a user of the mobile device 1200 may not have to wait for a long period of time to obtain a desired printout.

Figure 13A:
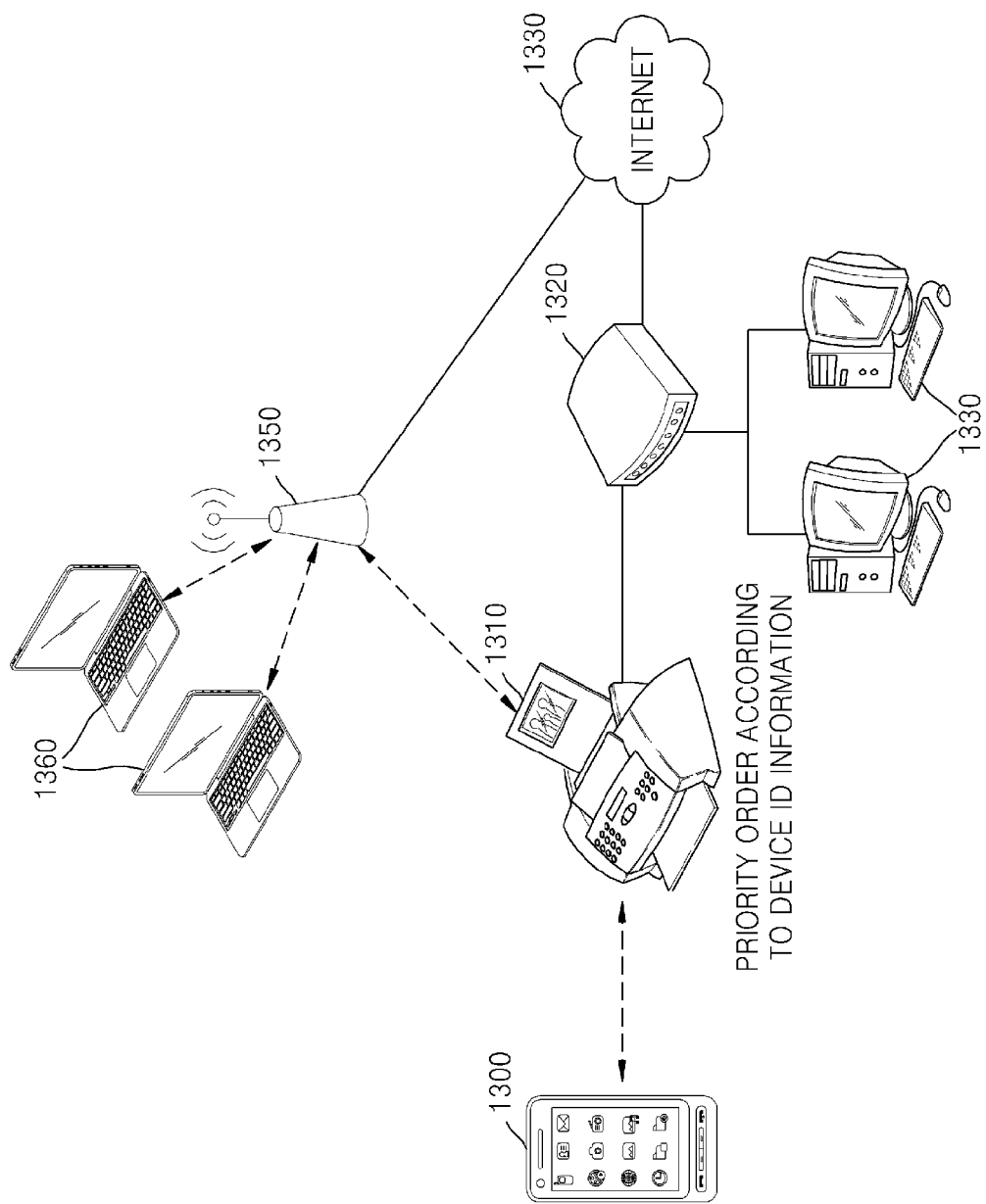

FIGS. 13A and 13B are diagrams illustrating an image forming system to form an image by adjusting a priority order of image-forming data, received from a mobile device, based on device identification information, according to an embodiment of the present general inventive concept.

In the present embodiment, an image-forming apparatus 1310 is referred to as an image-forming apparatus having a built-in WiFi-Direct function.

The image-forming apparatus 1310 may search for a WiFI-Direct device, so as to be connected to a nearby device via a WiFi-Direct connection. Then, the image-forming apparatus 1310 may obtain information about a WiFi-Direct device via a probe request and a probe response frame that are wireless local area network (LAN) packets. In other words, if the image-forming apparatus 1310 searches for a nearby device, the image-forming apparatus 1310 issues a probe request, and the nearby device may transmit a probe response frame to the image-forming apparatus 1310 in response to the probe request. As such, the image-forming apparatus 1310 may obtain information about the WiFi-Direct device. The obtained information about the WiFi-Direct device includes information that represents a type of the WiFi-Direct device.

Referring to FIG. 13B, a mobile device is in a category of a computer having an ID value of 1, and in a sub-category of a mobile internet device (MID) having an ID value of 7. Thus, the image-forming apparatus may determine that a corresponding WiFi-Direct device is a mobile device, with reference to the ID value in the category and the ID value in the sub-category that are included in the information about the WiFi-Direct device. Accordingly, the image-forming apparatus associates identification information of a device, such as an MAC address of the device, with information that represents that the corresponding WiFI-Direct device is a mobile device, and stores the associated information. Thus, when image-forming data is received from the corresponding mobile device, the image-forming apparatus extracts an MAC address from the received image-forming data, and compares the MAC address to the stored identification information. If the MAC address matches the stored identification information, the image-forming apparatus may recognize that the received image-forming data is image-forming data of a mobile device, and adjust a priority order of the recognized image-forming data that is received from the mobile device, so that the image-forming data may be printed earlier than other image-forming data. According to the adjusted priority order, the image-forming apparatus forms an image. Thus, a user of the mobile device 1200 may not have to wait for a long period of time until a printout of the image-forming data is obtained.

Figure 14:
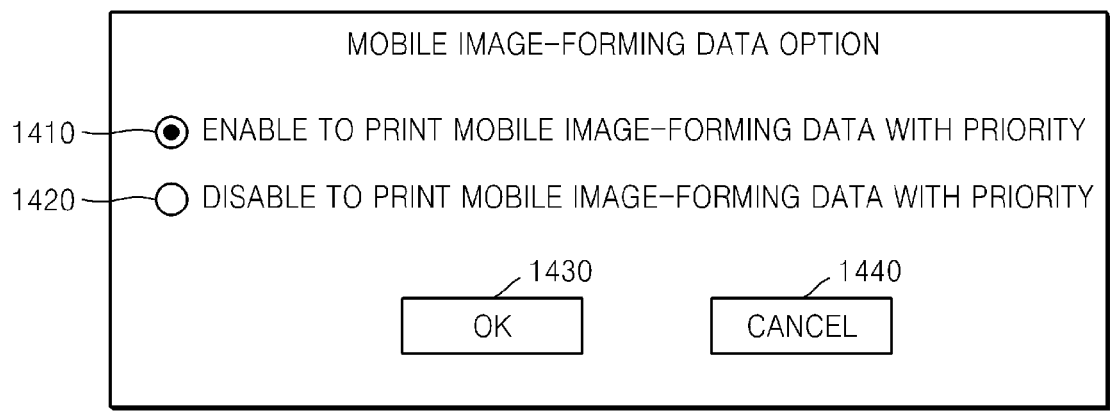
FIG. 14 is a diagram illustrating a user interface (UI) of an image-forming apparatus to select an option of whether to adjust a priority order of image-forming data of a mobile device, according to an embodiment of the present general inventive concept.

FIG. 14 is a diagram illustrating a user interface UI of an image-forming apparatus to select an option of whether to adjust a priority order of image-forming data of a device, according to an embodiment of the present general inventive concept.

Referring to FIG. 14, a user may select whether image-forming data from a mobile device is to be printed with priority or whether image-forming data is printed in an order in which an image-forming apparatus receives, by using an enable option 1410 and a disable option 1420. A user may set an option by selecting an option for mobile image-forming data using the enable option 1410 and the disable option 1420, and then, clicking an Ok button 1430. The user may cancel the option setting by clicking a cancel button 1440. If the option setting is cancelled, the image-forming apparatus processes image-forming data according to a previously-set option for mobile image-forming data.

Figure 15:
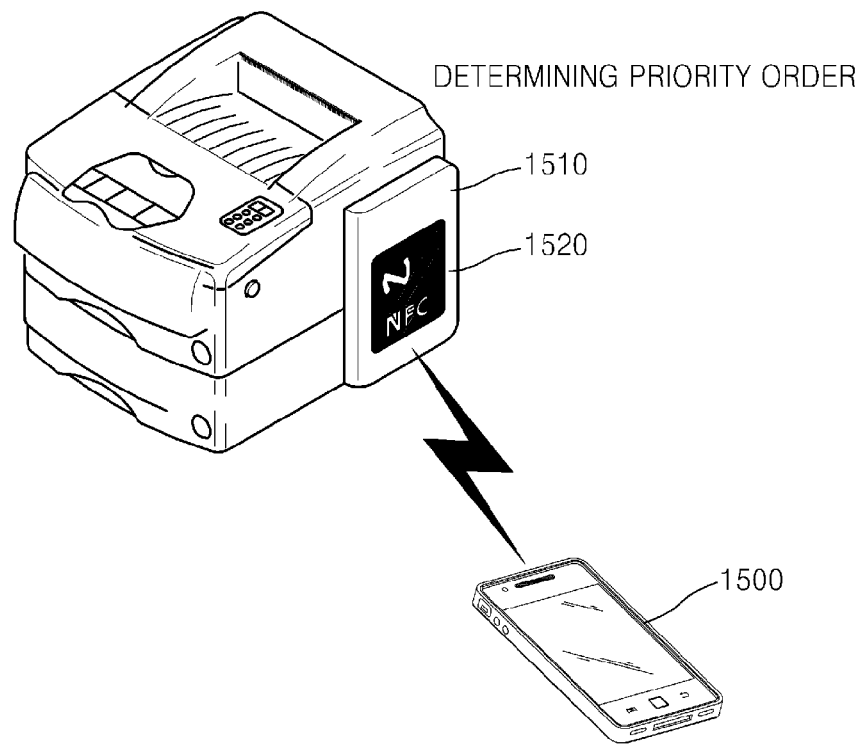
FIG. 15 is a diagram illustrating an image forming system to form an image by adjusting a priority order of image-forming data, which is received from a mobile device that is connected to an image-forming apparatus through near field communication (NFC) tagging, according to an embodiment of the present general inventive concept.

FIG. 15 is a diagram illustrating a system to form an image by adjusting a priority order of image-forming data of a mobile device 1500 that is connected to an image-forming apparatus 1510 through near field communication (NFC) tagging, according to an embodiment of the present general inventive concept.

A user may wirelessly connect the mobile device 1500 to the image-forming apparatus 1510 through NFC tagging. The mobile apparatus 1500 obtains connection information for being connected to a network interface of the image-forming apparatus 1510, for example, identification information of the image-forming apparatus 1510 such as an MAC address or an IP address, a service set identifier (SSID), or credential information for being connected to the image-forming apparatus 1510, by tagging on an NFC tag 1520 of the image-forming apparatus 1510. The mobile device 1500 may include a tag reader to read information of the NFC tag 1520.

A process of adjusting a priority order of image-forming data may vary with an NFC mode provided by the image-forming apparatus 1510. An NFC mode may be an NFC passive tag mode, an NFC active tag mode, or an NFC P2P communication mode.

An NFC passive tag mode is referred to as a mode in which a mainboard of an image-forming apparatus is not connected to an NFC tag, and connection information of an image-forming apparatus is stored in an NFC tag, and thus, the mobile device 1500 may read information from the NFC tag 1520 of the image-forming apparatus 1500. An NFC active tag mode is a mode in which a mainboard of an image-forming apparatus is connected to an NFC tag, and the image-forming apparatus stores connection information of the image-forming apparatus in an NFC tag. Thus, the mobile device 1500 may read information from the NFC tag 1520 of the image-forming apparatus 1510. With regard to both the NFC passive tag mode and the NFC active tag mode, only connection information may be read from an NFC tag 1520 included in the image-forming apparatus 1510, and the mobile apparatus 1500 may not transmit information to the image-forming apparatus 1510.

The mobile apparatus 1500 is connected to the image-forming apparatus 1510 based on the connection information, read from the NFC tag 1520, by using a WiFI-Direct connection. In this case, the mobile apparatus 1500 may be connected to the image-forming apparatus 1510 by using a Wi-Fi simple configuration (WSC) mode.

A WSC is also referred as a Wi-Fi protected setup (WPS), and is a mode of performing a security connection easily. The WSC mode may be a push button configuration (PBC) mode in which a button is clicked, or a personal information number (PIN) mode in which a PIN number is used. A user may store information about a mode to be used, from among the PBC mode and the PIN mode, in the image-forming apparatus 1510 in advance, and store the information in an NFC tag.

The mobile device 1500 may read information about a mode to be used to connect the image-forming apparatus 1510 to the mobile device 1500 through NFC tagging. The mobile device 1500 determines a connection mode, based on the information about the mode to be used to connect the image-forming apparatus 1510 to the mobile device 1500, and requests the image-forming apparatus 1510 for connection.

When receiving a request for connection according to a predetermined connection mode from the mobile device 1500, the image-forming apparatus 1510 may recognize that the mobile device 1500 requested connection through NFC tagging. Then, the image-forming apparatus 1510 may store information that represents the mobile apparatus 1500 is a device which requested connection through NFC tagging, in association with the identification information of the mobile apparatus 1500. When receiving image-forming data from the mobile apparatus 1500, the image-forming apparatus 1510 may compare the image-forming data to the identification information of the mobile device 1500, and thus determine that the image-forming data is image-forming data received from the device that requested for connection through the NFC tagging. Then, the image-forming apparatus 1500 may adjust a priority order of the image-forming data received from the mobile device 1500, so that the image-forming data of the mobile device 1500 may be printed earlier than other image-forming data. According to the adjusted priority order, the image-forming apparatus 1510 forms an image. Thus, a user of the mobile apparatus 1500 may not have to wait for a long period of time until a printout is obtained.

With an NFC P2P communication mode which is the other NFC mode, the mobile device 1500 may not only receive connection information via an NFC tag 1520, but also transmit the connection information to the image-forming apparatus 1510.

If the mobile device 1500 reads the connection information via the NFC tag 1520, the image-forming apparatus 1510 may receive identification information from the mobile device 1500 by requesting the mobile device 1500 for the identification information, and store the received identification information. Then, the mobile device 1500 may request the image-forming apparatus 1510 for connection by using a WiFi-Direct connection, and transmit identification information of the mobile device 1500 to the image-forming apparatus 1510.

The image-forming apparatus 1510 compares the received identification information of the mobile device 1500 to the stored identification information. Then, if it is determined that the received identification information is identical to the stored identification, the image-forming apparatus 1510 may recognize that the mobile device 1500 requested the image-forming apparatus 1510 for connection through NFC tagging. Then, if the image-forming apparatus 1510 receives image-forming data from the mobile device 1500, and if it is determined that identification information included in the image-forming data is identical to the determined identification information, the image-forming apparatus 1510 may determine that the image-forming data is image-forming data received from the device 1500 that is connected to the image-forming apparatus 1510 through NFC tagging. Accordingly, the image-forming apparatus 1510 adjusts a priority order of image-forming data, received from the mobile device 1500, to be higher than a priority order of image-forming data, received from another device, so that the image-forming data received from the mobile device 1500 is printed first. Thus, a user of the mobile device 1500 may not have to wait for a long period of time to obtain a desired printout.

Figure 16A:
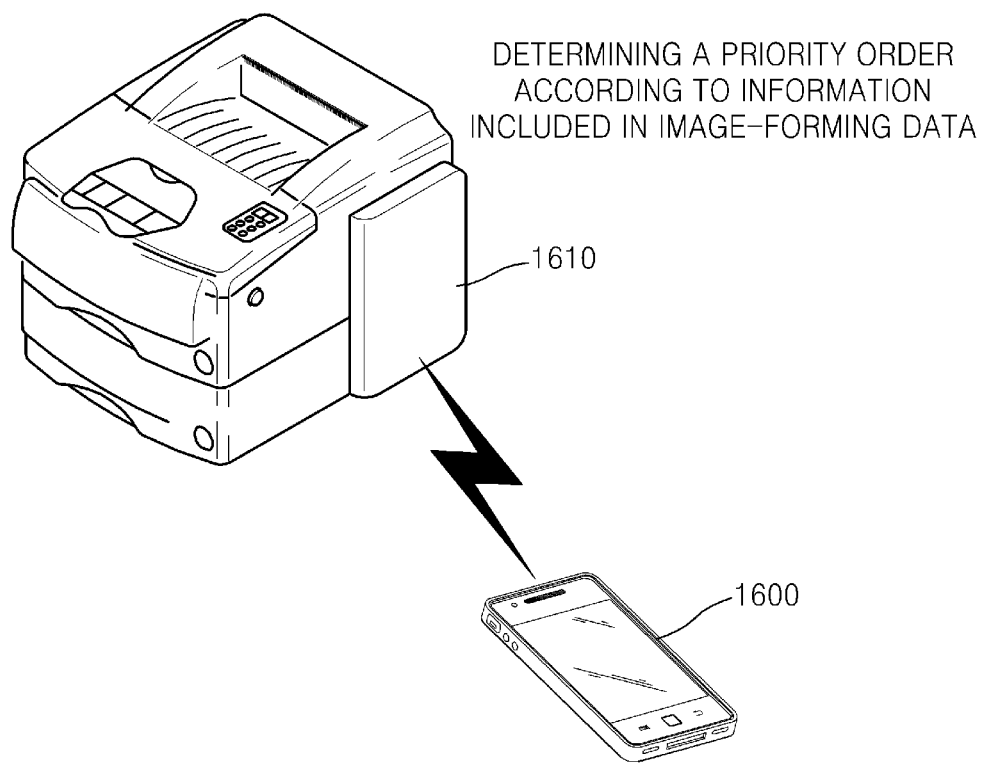
FIGS. 16A and 16B are diagrams illustrating an image forming system to form an image by adjusting a priority order of image-forming data, which is received from a mobile device, based on information that is included in the image-forming data according to an embodiment of the present general inventive concept.
Figure 16B:
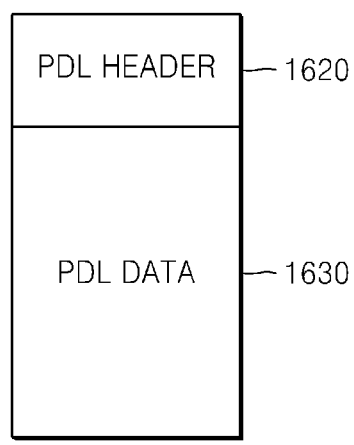

FIGS. 16A and 16B are diagrams illustrating a system to form an image by adjusting a priority order of image-forming data, which is received from a mobile device 1600, based on information that is included in the image-forming data, according to an embodiment of the present general inventive concept.

Referring to FIG. 16A, when the mobile device 1600 is connected to an image-forming apparatus 1610, the mobile device 1600 transmits image-forming data to the image-forming apparatus 1610. Referring to FIG. 16B, the image-forming data transmitted to the image-forming apparatus 1610 may include a page description language (PDL) header 1620 and PDL data 1630. The image-forming data may be data that is converted by a driver of the mobile device 1600. The PDL header includes additional information about a document to be printed, such as a type of document file to be printed, which is requested by the mobile device 1600, and a user of the mobile device 1600. The PDL data includes information about a detail of a document to be printed. When the mobile device 1600 generates image-forming data, the PDL header 1620 may include information about a type of the mobile device that generates the image-forming data. For example, the mobile device 1600 may generate image-forming data so that information such as TYPE=mobile' may be included in the PDL header in the image-forming data. The image-forming data may be transmitted to the image-forming apparatus 1610. The image-forming apparatus 1610 may receive the image-forming data and, by parsing 'TYPE=mobile' in the PDL header 1620, recognize that the received image-forming data is image-forming data that is received from the mobile device 1600. The image-forming apparatus 1610 may adjust a priority order of the image-forming data received from the mobile device 1600 so that the image-forming data received from the mobile device 1600 may be printed earlier than other image-forming data. According to the adjusted priority order, the image-forming apparatus prints the image-forming data. Thus, a user of the mobile device 1600 may not have to wait for a long period of time until a printout is obtained.

Figure 17A:
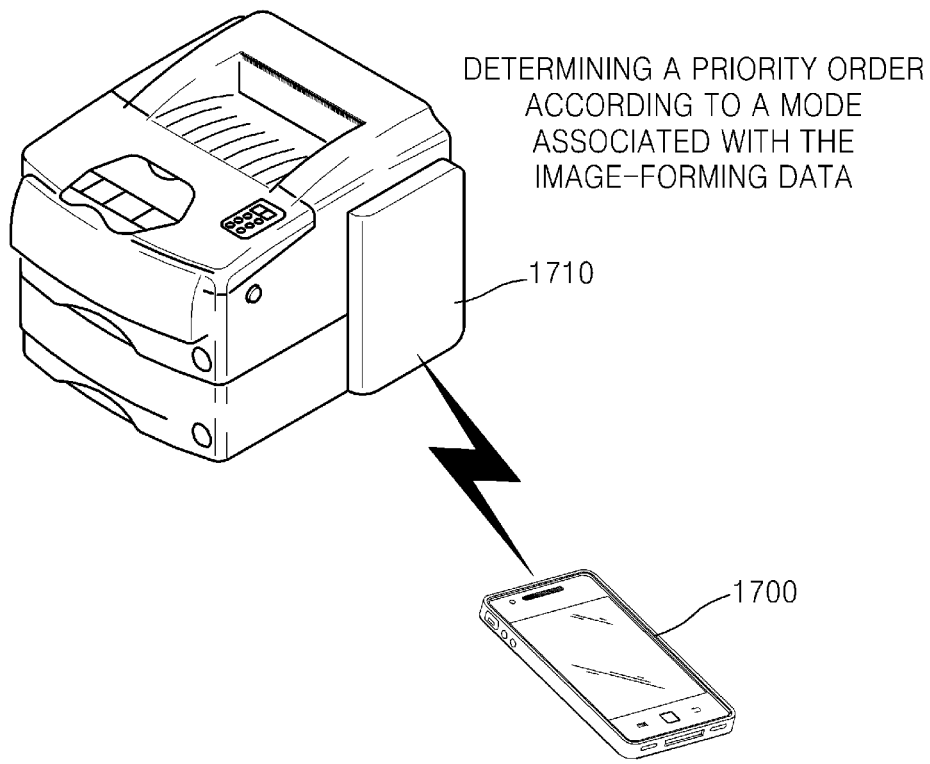
FIGS. 17A and 17B are diagrams illustrating an image forming system to form an image by adjusting a priority order of image-forming data, which is received from a mobile device, based on a mode of emulating the image-forming data, according to an embodiment of the present general inventive concept.
Figure 17B:
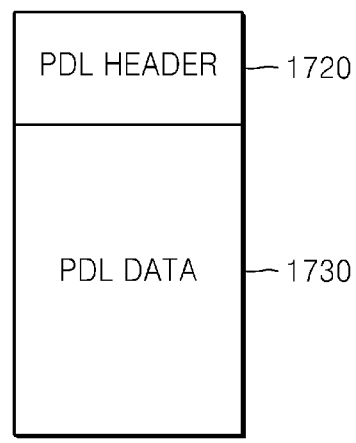

FIGS. 17A and 17B are diagrams illustrating a system to form an image by adjusting a priority order of image-forming data, which is received from a mobile device 1700, based on a mode of emulating the image-forming data, according to an embodiment of the present general inventive concept.

Referring to FIG. 17A, when the mobile device 1700 is connected to an image-forming apparatus 1710, the mobile device 1700 transmits image-forming data to the image-forming apparatus 1710. Referring to FIG. 17B, the image-forming data transmitted to the printer 1710 includes a PDL header 1720 and PDL data 1730. The PDL header 1720 may include additional information about a document to be printed, such as a type of document file to be printed, which is requested by the mobile device 1700, and a user of the mobile device 1600. The PDL data 1720 includes information about a detail of a document to be printed.

When image-forming data is generated by a driver included in a device, the image-forming data may become different according to an emulation mode. The emulation mode may vary with a type of the device. For example, in a case of a device such as a PC, image-forming data may be generated by using an emulation mode such as printer command language 6 (PCL6). In a case of a mobile device, image-forming data may be generated by using an emulation mode such as PWG.

In the current embodiment, if the mobile device 1700 generates image-forming data by using a driver included in the mobile device 1700, the mobile device 1700 employs a PWG emulation mode. The image-forming apparatus 1710 may receive the image-forming data from the mobile device 1700, check the PDL data 1730, and thus determine the emulation mode. In other words, the PDL data 1730 becomes different according to the emulation mode corresponding to the image-forming data. Accordingly, with reference to the PDL data 1730, an emulation mode that is used to generate image-forming data may be determined.

In addition, other embodiments of the present invention can also be implemented through computer readable code/ instructions in/on a medium, e.g., a computer readable medium, to control at least one processing element to implement any above described embodiment. The medium can correspond to any medium/media permitting the storage and/ or transmission of the computer readable code.

The computer readable code can be recorded/transferred on a medium in a variety of ways, with examples of the medium including recording media, such as magnetic storage media (e.g., ROM, floppy disks, hard disks, etc.) and optical recording media (e.g., CD-ROMs, or DVDs), and transmission media such as Internet transmission media. Thus, the medium may be such a defined and measurable structure including or carrying a signal or information, such as a device carrying a bitstream according to one or more embodiments of the present invention. The media may also be a distributed network, so that the computer readable code is stored/transferred and executed in a distributed fashion. Furthermore, the processing element could include a processor or a computer processor, and processing elements may be distributed and/or included in a single device.

It should be understood that the exemplary embodiments described therein should be considered in a descriptive sense only and not for purposes of limitation. Descriptions of features or aspects within each embodiment should typically be considered as available for other similar features or aspects in other embodiments.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An image forming method for an image-forming apparatus, the method comprising:
   wirelessly connecting, by the image forming apparatus, to a device;
   adjusting, at one or more processors in the image forming apparatus, a priority order of image-forming data, received from the connected device based on a determined mobility type of the connected device or a determined mode of wireless communication by which the image forming apparatus receives the image-forming data from the connected device; and
   controlling, at the one or more processors, the image forming apparatus to form an image from the image-forming data in an automated arranged order, compared to other image forming operations, based on the adjusted priority of the image-forming data.

2. The method of claim 1, wherein, when the determined mobility type of the connected device represents that the connected device is a device that is mobile, the adjusting of the priority order comprises adjusting the priority order of the image-forming data that is received from the connected device to be higher than a priority order of image-forming data that is received from another device.

3. The method of claim 1, wherein:
   the image-forming data that is received from the connected device comprises information that represents a type of the connected device;
   the method further comprises determining the type of the connected device based on the information from the image-forming data that represents the type of the connected device; and
   the adjusting of the priority order comprises, when the determined type represents that the connected device is a device that is mobile, adjusting the priority order of the image-forming data that is received from the connected device to be higher than a priority order of image-forming data that is received from another device that is of a type that represents that the other device is a device that is not mobile.

4. The method of claim 1, further comprising:
   receiving device identification information, in which a type of the connected device is identified, from the connected device; and determining the type of the connected device, based on the device identification information, wherein the adjusting of the priority order comprises, when the determined type represents that the connected device is a device that is mobile, adjusting the priority order of the image-forming data that is received from the connected device to be higher than a priority order of image-forming data that is received from another device.

5. The method of claim 1, further comprising:
determining a type of the connected device, according to a determined emulation mode that the received image-forming data conforms with, wherein the adjusting of the priority order comprises, when the determined type represents that the connected device is a device that is mobile, adjusting the priority order of the image-forming data that is received from the connected device to be higher than a priority order of image-forming data that is received from another device.

6. The method of claim 1, further comprising:
determining a type of a communication interface, representing the mode of wireless communication, that creates the connection between the image-forming apparatus and the device, wherein the adjusting of the priority order comprises adjusting the priority order of the image-forming data based on the determined type of the communication interface.

7. The method of claim 6, wherein the adjusting of the priority order comprises, when the determined type of the communication interface is determined to be a WiFi-Direct interface, adjusting the priority order of the image-forming data that is received from the connected device to be higher than a priority order of image-forming data that is received from another device.

8. The method of claim 1, further comprising:
determining whether an IP address in the image-forming data matches a previously allocated IP address of the connected device, the previously allocated IP address of the connected device having been previously determined to be for a device that is mobile, wherein the adjusting of the priority order comprises, when it is determined that the IP address in the image-forming data matches the previously allocated IP address of the connected device, adjusting the priority order of the image-forming data that is received from the connected device to be higher than a priority order of image-forming data that is received from another device.

9. The method of claim 1,
wherein the connecting of the image-forming apparatus to the device includes determining whether identification information of the connected device that is exchanged with the connected device matches previously received identification information of the connected device, the previously received identification of the connected device having been previously obtained through near field communication (NFC) tagging with the connected device, wherein the adjusting of the priority order comprises, when it is determined that the identification information of the connected device that is exchanged with the connected device matches the previously received identification information of the connected device, adjusting the priority order of the image-forming data that is received from the connected device to be higher than a priority order of image-forming data that is received from another device.

10. The method of claim 1, further comprising:
receiving from a user a user input that indicates whether the priority order of the image-forming data is to be adjusted according to the mobility type of the connected device or the mode of wireless communication, wherein the adjusting of the priority order comprises, when receiving from the user the user input that indicates that a priority order of the image-forming data is to be adjusted according to the mobility type of the connected device or the mode of wireless communication, adjusting the priority order of the image-forming data that is received from the connected device.

11. An image-forming apparatus, the apparatus comprising:
a wireless communication device to wirelessly connect the image-forming apparatus to a device and to receive image-forming data from the connected device;
a controller including one or more processors configured to adjust a priority order of the image-forming data, received from the connected device by the wireless communication unit, based on a determined mobility type of the connected device or a determined mode of wireless communication by which the wireless communication unit receives the image-forming data from the connected device; and
an image-forming unit including printer hardware configured to form an image on a medium,
wherein the controller controls the image forming unit to form an image from the image-forming data in an automated arranged order, compared to other image forming operations, based on the adjusted priority of the image-forming data.

12. The image-forming apparatus of claim 11, wherein, when the determined mobility type of the connected device represents that the connected device is a device that is mobile, the controller adjusts the priority order of the image-forming data that is received from the connected device to be higher than a priority order of image-forming data that is received from another device.

13. The image-forming apparatus of claim 11, wherein:
the image-forming data that is received from the connected device comprises information that represents a type of the connected device;
the controller determines the type of the connected device, based on the information from the image-forming data that represents the type of the connected device; and
wherein, when the determined type represents that the connected device is a device that is mobile, the controller adjusts the priority order of the image-forming data that is received from the connected device to be higher than a priority order of image-forming data that is received from another device that is of a type that represents that the other device is a device that is not mobile.

14. The image-forming apparatus of claim 11, wherein:
the communication unit receives device identification information, in which a type of the connected device may be identified, from the connected device;
the controller determines the type of the connected device, based on the device identification information; and
when the determined type of the connected device represents that the connected device is a device that is mobile, the controller adjusts the priority order of the image-forming data that is received from the connected device to be higher than a priority order of image-forming data that is received from another device.

15. The image-forming apparatus of claim 11, wherein
the controller determines a type of the connected device, according to a determined emulation mode that the received image-forming data conforms with, and
when the determined type of the device represents that the connected device is a device that is mobile, the controller adjusts the priority order of the image-forming data that is received from the connected device to be higher than a priority order of image-forming data that is received from another device.

16. The image-forming apparatus of claim 11, wherein
the communication unit determines a type of a communication interface, representing the mode of wireless communication, that creates the connection between the image-forming apparatus the device, and
the controller adjusts the priority order of the image-forming data that is received from the connected device based on the determined type of the communication interface.

17. The image-forming apparatus of claim 11, wherein
the controller determines whether an IP address in the image-forming data matches a previously allocated IP address of the connected device, the previously allocated IP address of the connected device having been previously determined to be for a device that is mobile, and
when it is determined that the IP address in the image-forming data matches the previously allocated IP address of the connected device, the controller adjusts the priority order of the image-forming data that is received from the connected device to be higher than a priority order of image-forming data that is received from another device.

18. The image-forming apparatus of claim 11, wherein:
the controller determines whether identification information of the connected device that is exchanged with the connected device matches previously received identification information of the connected device, the previously received identification of the connected device having been previously obtained through near field communication (NFC) tagging with the connected device, and
when it is determined that the identification information of the connected device that is exchanged with the connected device matches the previously received identification information of the connected device, the controller adjusts the priority order of the image-forming data that is received from the connected device to be higher than a priority order of image-forming data that is received from another device.

19. The image-forming apparatus of claim 11, further comprising:
a user input unit to receive from a user a user input that indicates whether the priority order of the image-forming data is to be adjusted according to the mobility type of the connected device or the mode of wireless communication,
wherein, when receiving from the user input unit the user input that indicates that a priority order of the image-forming data is to be adjusted according to the mobility type of the connected device or the mode of wireless communication, the controller adjusts the priority order of the image-forming data that is received from the connected device.

20. An image-forming apparatus comprising:
a controller, including one or more processors, to adjust a priority order of image-forming data received from one or more external devices, based on a predetermined characteristic of one of the external devices so that the image-forming data are printed on a print medium according to the adjusted priority order,
wherein the characteristic of the one external device is predetermined based on a determination made for a previous image forming operation for the one external device.

* * * * *